US012646903B2

(12) United States Patent
Mathai

(10) Patent No.: US 12,646,903 B2
(45) Date of Patent: Jun. 2, 2026

(54) OPTICAL WAVEGUIDE AMPLIFIERS WITH DOPED SILICON-BASED CORE

(71) Applicant: HEWLETT PACKARD ENTERPRISE DEVELOPMENT LP, Spring, TX (US)

(72) Inventor: Sagi Varghese Mathai, Sunnyvale, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 464 days.

(21) Appl. No.: 18/488,308

(22) Filed: Oct. 17, 2023

(65) Prior Publication Data

US 2025/0125577 A1 Apr. 17, 2025

(51) Int. Cl.
*H01S 3/16* (2006.01)
*H01S 3/067* (2006.01)
*H01S 3/094* (2006.01)

(52) U.S. Cl.
CPC ........ *H01S 3/1613* (2013.01); *H01S 3/06716* (2013.01); *H01S 3/094007* (2013.01)

(58) Field of Classification Search
CPC .............. H01S 3/1613; H01S 3/06716; H01S 3/094007; H01S 3/0064; H01S 3/2308; H04B 10/2912; G02F 1/395; G02F 6/12; G02F 27/283; G02F 27/286; G02F 2006/12061; G02F 2006/12116; G02F 2006/12147; G02F 2006/12164
See application file for complete search history.

(56) References Cited

U.S. PATENT DOCUMENTS

| | | | |
|---|---|---|---|
| 5,727,007 | A | 3/1998 | Smart et al. |
| 6,510,276 | B1 | 1/2003 | Jain et al. |
| 2002/0191935 | A1 | 12/2002 | Gao |
| 2003/0219208 | A1 | 11/2003 | Kwon et al. |
| 2007/0253055 | A1 | 11/2007 | Chowdhury et al. |
| 2018/0083411 | A1 | 3/2018 | Kang |
| 2023/0350131 | A1* | 11/2023 | Tanaka ................... G02B 6/136 |

FOREIGN PATENT DOCUMENTS

WO 2003/079070 A2 9/2003

OTHER PUBLICATIONS

L. Bodiou et al., "Design of a mid-infrared multispecies gas sensor based on Pr3+-doped chalcogenides waveguides," 2019 Photonics North (PN), Quebec City, QC, Canada, 2019, pp. 1-1, doi: 10.1109/PN.2019.8819593. (Year: 2019).*

(Continued)

*Primary Examiner* — Matthew Mikels
(74) *Attorney, Agent, or Firm* — Jones Robb PLLC

(57) ABSTRACT

An optical device comprises a Praseodymium (Pr)-dope waveguide optical amplifier capable of amplifying O-band light. The waveguide optical amplifier may be formed on the substrate (e.g., silicone or glass) and comprises a core defining an optical path through the waveguide optical amplifier, and cladding abutting at least one side of the core. The core comprises a silicon-based material, such as silicon nitride (Si3N4), doped with Praseodymium (Pr) such that, on condition of pump light and O-band signal light being passed through the waveguide optical amplifier, the waveguide optical amplifier amplifies the O-band signal light.

20 Claims, 18 Drawing Sheets

10

(56) References Cited

OTHER PUBLICATIONS

X. Chen, C. Li and H. K. Tsang, "Grating coupler for mid-infrared silicon-on-sapphire waveguide," 2009 14th OptoElectronics and Communications Conference, Hong Kong, China, 2009, pp. 1-2, doi: 10.1109/OECC.2009.5222623. (Year: 2009).*
Liu et al., "A photonic integrated circuit based erbium-doped amplifier", Apr. 12, 2022, 25 pages.

* cited by examiner

FIG. 1          10
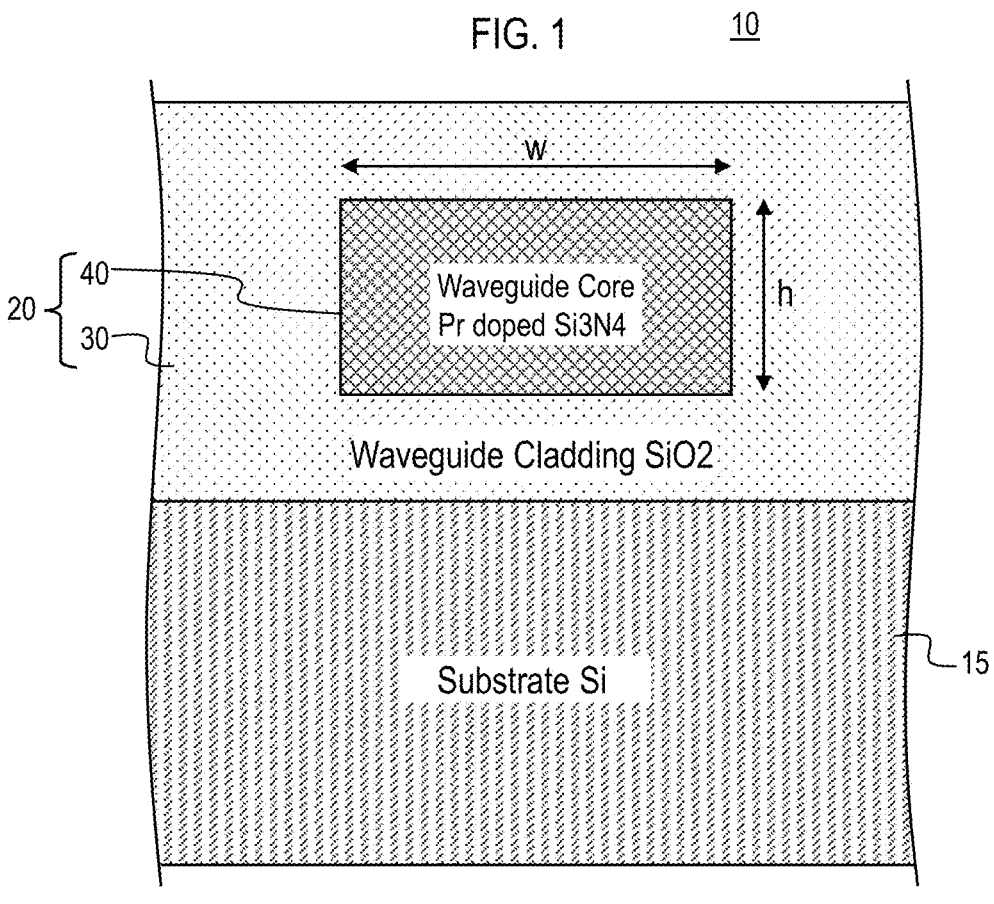
FIG. 2          10
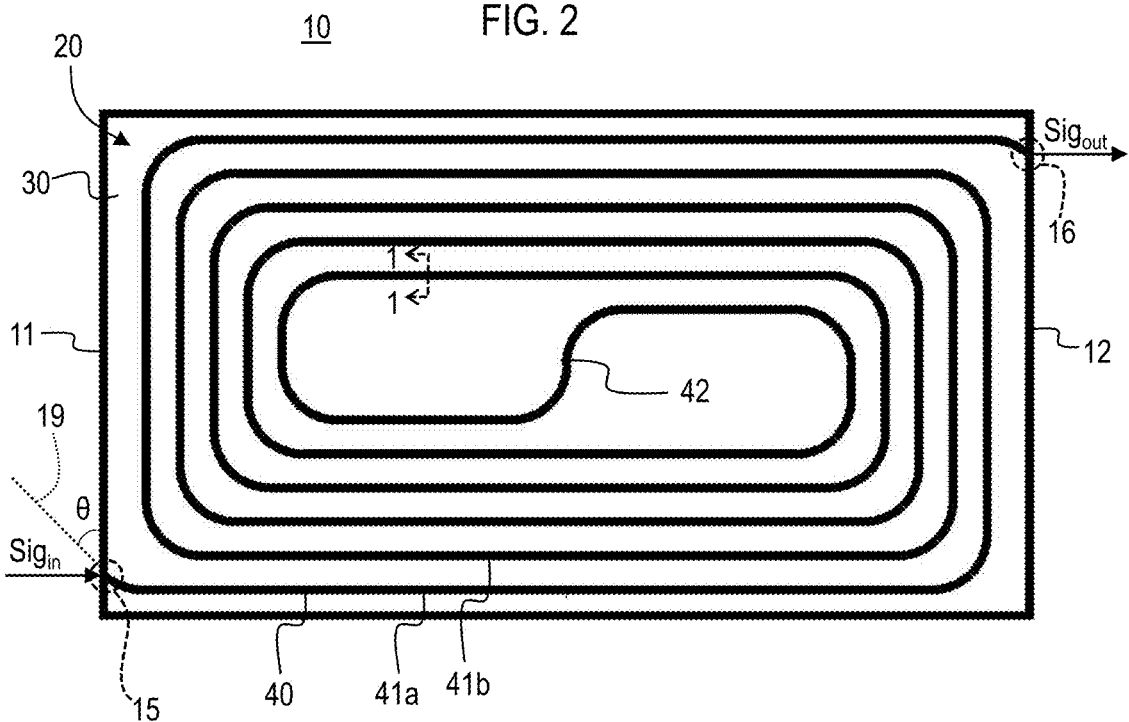

740    1st Core Portion
       Pr doped Si3N4

2nd Core Portion
undoped Si3N4

730

Waveguide Cladding SiO2

715    Substrate Si

810

2nd Core Portion
undoped Si3N4

846

840

830

1st Core Portion
Pr doped Si3N4

820

Waveguide Cladding SiO2

815    Substrate Si

FIG. 14

OPTICAL WAVEGUIDE AMPLIFIERS WITH DOPED SILICON-BASED CORE

INTRODUCTION

In photonic communications, information is encoded in light signals and transmitted through photonic interconnects, such as optical fibers. As light is transmitted through such interconnects, the light signals tend to diminish in strength due to dispersion, leakage, or other effects. Thus, to avoid the signal becoming too weak, optical amplifiers are generally added periodically in a photonic network to amplify the light signals. Optical amplifiers generally are configured to amplify light signals whose wavelengths fall within a particular range (band), and generally do not work to amplify light signals having wavelengths outside that range. Thus, different types of optical amplifiers may be used in different networks depending on which particular wavelengths of light are used in that network. For example, long-haul communications networks, such as telecommunications interconnects, have traditionally utilized light from a so-called C-band (wavelengths of 1530-1565 nm), and thus optical amplifiers configured to operate in the C-band tend to be desired for such applications. On the other hand, datacenters or other more local interconnects tend to use light from the so-called O-band (wavelengths of 1260-1360 nm), and thus optical amplifiers configured to operate in the O-band tend to be desired for such applications.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operation. In the drawings:

FIG. 1 is a schematic cross-section of an example optical device comprising a waveguide optical amplifier, with the section taken along 1-1 in FIG. 2.

FIG. 2 is a schematic plan view of the example optical device of FIG. 1.

FIG. 12 is a schematic cross-section of another example optical device comprising a waveguide optical amplifier comprising a doped core portion and an undoped core portion in the same vertical layer.

FIG. 14 is a schematic plan view of another example optical device comprising a waveguide optical amplifier with integrated wave-length-division (WDM) combiners and a doped core portion and an undoped core portion in a same vertical layer.

DETAILED DESCRIPTION

Figures 3, 4:
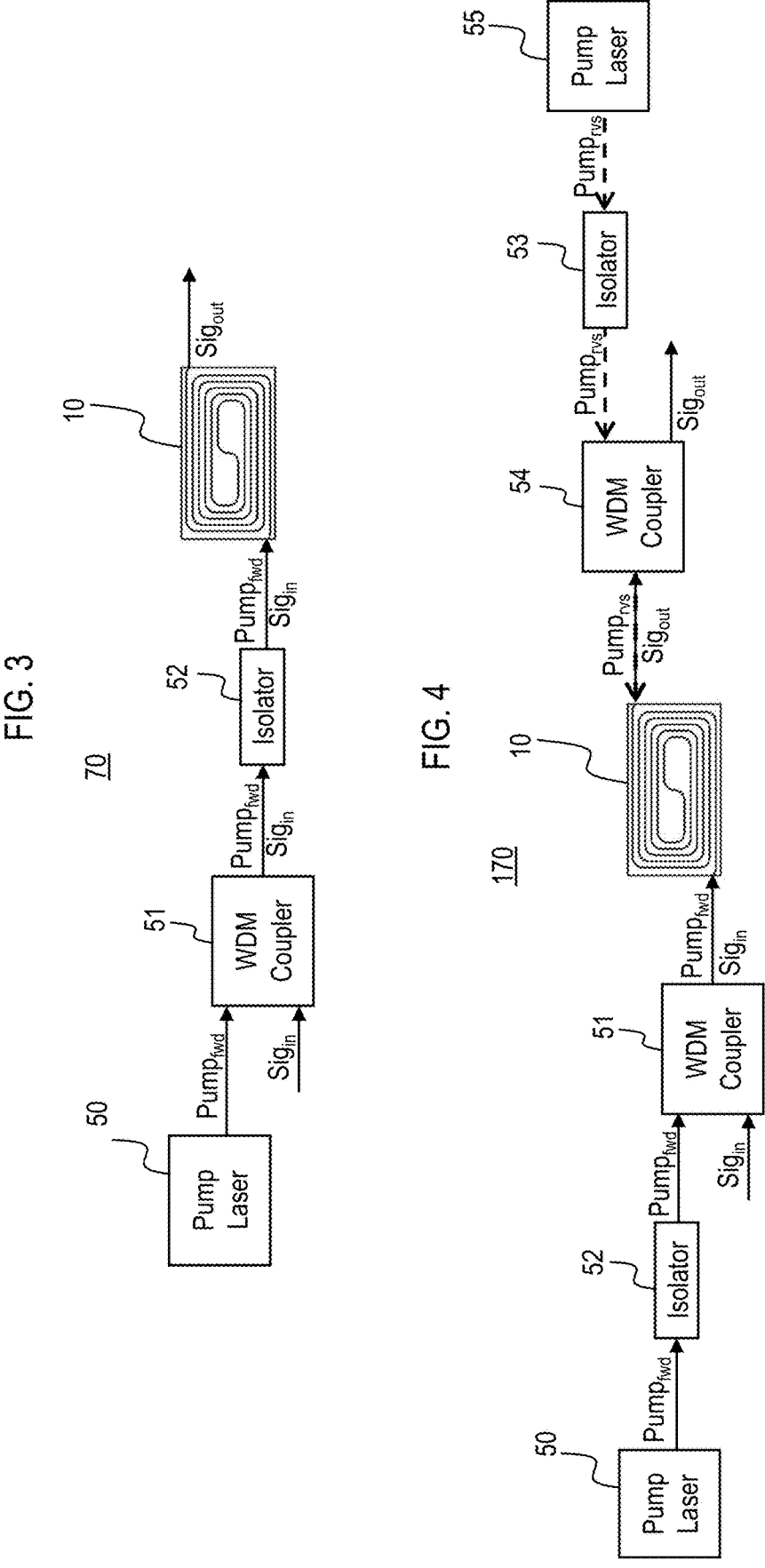
FIG. 3 is block diagram illustrating an example optical circuit comprising an example optical device and forward pumping components.
FIG. 4 is block diagram illustrating another example optical circuit comprising an example optical device with forward and reverse pumping components.

Disclosed herein are various waveguide optical amplifiers and optical devices comprising such optical amplifiers. Waveguide optical amplifiers disclosed herein comprise waveguides formed on a silicon substrate. More specifically, each of the disclosed waveguides has a core portion defining an optical path and cladding at least partially surrounding the core portion, wherein the core portion is formed from silicon-based material, such as silicon nitride (Si3N4), which has been doped with a rare-earth element, and the cladding comprises a silicon-based material having a different refractive index, such as silicon oxide (SiO2). The core and cladding together form a waveguide, which guides light along the optical path defined by the core. Moreover, as a light signal is transmitted through this waveguide, it interacts with the dopant atoms in the core and is amplified via the phenomenon of stimulated emission. In particular, a process called "pumping" is used to excite the dopant, which comprises passing light having a particular wavelength ("pump light") through the waveguide, with the pump light being absorbed by the dopant atoms and thereby causing electrons of the dopant atoms to be excited from a ground energy state to an excited energy state. Then the information-carrying light signal which is to be amplified is passed through the waveguide, and when this signal light encounters an excited dopant atom, the signal light will interact with the excited electron of the dopant atom and cause the electron to transition to a lower energy state and also release a photon (light). The released photon has the same wavelength and travels in the same direction as the original signal light, and thus the released photon joins with the signal light, thus increasing the overall intensity of the signal. Many such stimulated emissions occur as the signal light passes through the waveguide, resulting in the signal light that exits the waveguide having an intensity that is greatly amplified compared to the signal light that entered the waveguide.

In some examples, the dopant used in the core portion of the waveguide comprises Praseodymium (Pr) and the waveguide optical amplifier is capable of operating in the O-band. This may be referred to as a Pr-doped waveguide amplifier (PDWA). Such PDWAs can be relatively small, cost effective, and low noise, as compared to other types of optical amplifiers, as will be discussed further below.

In some examples, optical devices disclosed herein comprise a combination of doped waveguide portions and undoped waveguide portions which are disposed in the same chip. More specifically, these example optical devices have at least a first waveguide core portion comprising doped Si3N4 (doped with a rare-earth element, such as Praseodymium (Pr), Erbium (Er), Ytterbium (Yb), etc.) and a second waveguide core portion comprising undoped Si3N4. The doped waveguide core portion forms a waveguide optical amplifier (such as one of the PDWAs described above), whereas the undoped waveguide core portions may form a waveguide of another optical component (such as a wavelength division (WDM) coupler). The waveguide optical amplifier and the other optical component formed by the doped and undoped waveguide core portions are integrated on the same chip. In other words, the optical device is a photonic integrated circuit comprising the waveguide optical amplifier (with the doped waveguide core portion) and the other optical component (with the undoped waveguide core portion). In some examples, the doped and undoped waveguide core portions are provided within the same vertical layer of the chip (vertical here referring to a direction in which layers are stacked). In other examples, the doped and undoped waveguide core portions are provided in different vertical layers of the chip, and in some cases may vertically overlap one another.

In some examples, optical devices disclosed herein comprise multiple doped waveguide core portions formed in different vertical layers. For example, some optical devices disclosed herein may comprise two separate waveguide optical amplifiers formed in different vertical layers on the same chip. As another example, some optical devices disclosed herein may comprise a single waveguide optical amplifier which has multiple doped waveguide portions formed in different vertical layers on the same chip.

In some examples, optical amplifiers disclosed herein have waveguides defining a double spiral path, which is relatively space efficient, allowing for a long waveguide to be formed in a relatively small area. In some examples, multiple such waveguides may be disposed within essentially the same region of the chip by arranging the waveguides as parallel interleaved double spirals, allowing for even further space efficiency.

In addition, some example optical amplifiers disclosed herein are modular in that they can be used as building blocks which can be combined together to generate a larger optical system comprising multiple optical amplifiers. For example, the optical amplifiers can be arranged in one, two, or three dimensional arrays of arbitrary size, forming a system capable of amplifying an arbitrary number of input light signals. They may be arranged in parallel to amplify multiple optical channels and in series to amplify a single optical channel. These arrays may comprise discrete chips arranged together or may be formed together as part of the same chip (i.e., forming a photonic integrated circuit).

Moreover, a variety of different configurations are disclosed herein for various waveguide optical amplifiers, including configurations with a variety of layouts for input and output ports. For example, in some waveguide optical amplifiers disclosed herein input ports and output ports are disposed on different edges of the device, whereas in other examples, input ports and output ports are disposed on the same edge of the device.

Moreover, some example optical devices disclosed herein implement a polarization diversity scheme, which allows for the waveguide amplifier to successfully amplify a light signal having two polarizations. For example, in some optical devices disclosed herein, polarization splitters, rotators and combiners may be integrated into the same chip as the waveguide optical amplifier.

As noted above, the various waveguide optical amplifiers and associated optical devices disclosed herein may have some advantages over other types of optical amplifiers in certain contexts. One type of optical amplifier is a fiber optical amplifier (FOA), which comprise a length of optical fiber which has been doped with rare earth elements. Different FOAs exist for different bands of the photonic communications spectrum, including the C-band, O-band and other bands. However, a long length of doped fiber is usually needed in such an FOA in order to obtain the desired amplification, and because the fiber generally cannot be bent very tightly, the FOA generally has a relatively large loop of fiber. Thus, FOAs tend to be rather large and cumbersome, and may be less desirable for use in datacenters or other applications where space may be more constrained. In contrast, the optical devices and waveguide optical amplifiers disclosed herein can be made relatively small and thus may be better suited for use in such applications.

Another type of optical amplifier is a semiconductor optical amplifier (SOA), which is formed using III-V semiconductor media. These SOA use quantum dots, quantum wells or bulk semiconductors, and the phenomenon of hole/electron recombination to amplify the light signal. Such SOA can be very small. However, SOA also tend to have high noise and some other drawbacks, and thus they may not be suitable for all applications. In contrast, the optical devices and waveguide optical amplifiers disclosed herein are also relatively small but have much less noise.

Another type of optical amplifier is an Erbium (Er) doped waveguide formed on a silicon substrate (i.e., an Er-doped waveguide amplifier (EDWA)). These can be relatively small and cost effective with relatively low noise. However, these EDWA generally work only in the C-band, and thus may not be suitable for use in applications in which O-band light is used, such as datacenters. In contrast, the PDWA disclosed herein are able to operate in the O-band. In addition, example waveguide optical amplifiers disclosed herein may include waveguide designs that are relatively more space efficient, allowing for smaller packages than some EDWA. Furthermore, example waveguide optical amplifiers disclosed herein may include vertically stacked waveguide components allowing for even more space efficiency than some EDWA. In addition, example waveguide optical amplifiers disclosed herein may include undoped waveguide components integrated along with the waveguide optical amplifier, thus obviating the need to provide for separate optical components, increasing convenience and usability, and further optimizing space efficiency as compared to some EDWA.

Turning now to the figures, various devices, systems, and methods in accordance with aspects of the present disclosure will be described.

FIGS. 1 and 2 schematically illustrate an example optical device 10 comprising a Pr-doped waveguide optical amplifier (PDWA) 20 capable of amplifying light with wavelengths in the O-band ("O-band light"). FIG. 2 shows the optical device 10 in plan view, while FIG. 1 shows a cross-section of a portion of the optical device 10 with the section taken along 1-1 in FIG. 2. FIGS. 1 and 2 are schematic in nature and not intended to illustrate specific dimensions or other structural details accurately or to scale, unless otherwise noted.

The optical device 10 comprises a substrate 15 and a PDWA 20 formed on the substrate 15. In an example, the substrate 15 comprises Silicon (Si). In another example, the substrate may be glass. The substrates 15 may come in a variety of sizes, which may include various industry standard sizes. In on example, the substrate 15 may have a thickness of about 0.5 mm to 1.5 mm.

The PDWA 20 comprises a waveguide formed from a waveguide cladding 30 and a waveguide core 40, with the cladding 30 at least partially surrounding the core 40 in a cross-section thereof (i.e., the cladding 30 abuts at least one side of the core 40, and in some cases abuts multiple sides thereof). The core 40 is doped with Pr atoms, which allow for the amplification of O-band light, as will be described in greater detail below. The cladding 30 and core 40 are both formed from Silicon-based materials (with different refractive indexes). In an example, the cladding 30 comprises Silicon Dioxide ($SiO_2$) and the core comprises Pr-doped Silicon Nitride (Si3N4). Other silicon based materials are also possible for either or both of the core 40 and/or cladding 30. For example, silicon rich nitride, Silicon Oxynitride ($Si(x)O(y)N(z)$) could be used for both core 40 and cladding 30, with the composition of Silicon Oxynitride being tuned to achieve a high or low refractive index for use as the core 40 and cladding 30, respectively. As another example, SiO2 could be used for the core 40 or Si3N4 for the cladding 30.

The thickness of the cladding 30 is a design parameter and depends on the intended device and the refractive index of the core 40 and cladding 30 (in other words the exact material composition of each layer). In some examples, the cladding 30 may be about 0.05 micron to 5 micron in thickness.

In some examples, the core 40 may also be doped with other rare earth elements, in addition to Pr. The Pr dopants may continue to act as the primary light amplifier which provides the desired amplification of the O-band light, but the additional rare earth dopants may be co-implanted with the Pr dopants to act as a sensitizer and improve the pumping efficiency of the Pr atoms, or to achieve some other desired effect. One example of a suitable material for co-implanting with the Pr dopant is Ytterbium (Yb).

In FIG. 1, the waveguide of the PDWA 20 has a buried channel configuration in which the cladding 30 surrounds the core 40 on top, bottom, and both lateral sides thereof. In particular, in some examples the core 40 has a width indicated by w in FIG. 1 of about 600 nm and a height indicated by h in FIG. 1 of about 300 nm. This configuration, together with the noted materials of the core 40 and channel 30, can result in the waveguide having a moderate Δn of about 0.17, relatively low losses, high optical confinement, good field overlap between the pump and signal modes, and low minimum bend radius. In some examples, the waveguide is single mode for the pump and across the entire O-band. Although not illustrated in FIGS. 1 and 2, adiabatic transitions may be utilized to transition to wider multimode waveguides for lower propagation loss without exciting higher order modes in the wider waveguide.

In other examples, the waveguide of the PDWA 20 may have other configurations, such as: a ridge configuration in which cladding 30 abuts the bottom side of the core 40 with other sides being open to air; a strip-loaded configuration in which the cladding 30 abuts the bottom side and part of the top side of the core 40; a rib configuration in which the core 40 has a relatively wide bottom portion with a relatively narrow ridge like portion on top of the wide bottom portion, wherein the cladding 30 abuts the bottom side of the core 40; or any other desired waveguide configuration. The thickness and other dimensions of the cladding 30 and core 40 may vary depending on the device, as would be familiar to those of ordinary skill in the art.

As shown in FIG. 2, in some examples the waveguide of the PDWA 20 defines an optical path with a double spiral shape. As used herein, a double spiral is a shape having two spiral portions: a first portion that spirals inward towards a center and a second portion that spirals outward from the center, with the two portions being joined together at a change-over point (generally near a center of the shape). For example, in FIG. 1 the core 40 forms an optical path extending from the input port 15 to the output port 16, wherein the optical path forms a double spiral comprising a first spiral portion 41a that spirals inward from the input port 15 toward the change-over point 42, and a second spiral portion 41b that spirals outward from the change-over point 42 to the output port 16. In some examples, the bend radius of the core 40 along this double spiral path may be maintained at least at 70 μm or greater (i.e., less than or equal to 0.2 dB/cm or 0.01 dB/90 deg bend). Wider waveguides, and larger bend radius or Euler bends with appropriate adiabatic transitions can reduce the straight and bent waveguide propagation losses, respectively.

As noted above, the optical path formed by the core 40 may take a double spiral path. Spiral as used herein refers to a path that circles repeated around a central point forming successively nested loops around that point, with each of the loops (except for an outermost loop) being contained within another one of the loops. In other words, the loops get progressively closer to the central point if the path is traversed in one direction or progressively further from the center point if the path is traversed in the opposite direction. These loops of the spiral do not necessarily have to be circular or even rounded, and may have straight portions. Moreover, although the loops of the illustrated double spiral have a generally rectangular shape (with rounded corners), any other desired shape may be used, such as circular, elliptical, trapezoidal, pentagonal, etc. In other examples the PDWA may have a similar construction and operation as the PDWA 20 described above, except with that the waveguide core portion thereof may define a path having a shape other than a double spiral, such as a straight linear path (not illustrated), a serpentine path (e.g., see FIG. 11), a double serpentine path (e.g., extending in a serpentine fashion in one direction from one region to a second region and then doubling back at the second region to proceed in a serpentine fashion back to the original starting region) (not illustrated), or any other desired path.

The PDWA 20 also comprises an input port 15 and an outlet port 16, which were mentioned above. These ports 15 and 16 are configured to be optically coupled (and in some cases, physically connected) to an input optical fiber and output optical fiber, respectively. Thus, an input light signal $SIG_{in}$ carried on the input optical fiber may be introduced to the core 40 of the PDWA 10 via the input port 15, and subsequently amplified as it passes through the path defined by the core 40, and then the amplified output light signal $SIG_{out}$ passes out from the PDWA 20 to the output optical fiber via the output port 16. The ports 15 and 16 may comprise edge couplings with an external lens or turning mirror (or lens), edge couplings with spot size transformers (e.g., V-grooves may be etched into the silicon substrate to facilitate physical attachment of the optical fiber at the ports 15 and 16), surface couplings with a grating coupler or on-chip turning mirror (or lens), or any other known form of optically coupling optical fibers to optical devices. In the example illustrated in FIG. 2, the input port 15 and outlet port 16 are disposed on opposite edges of the optical device 10, namely on a first edge 11 and a second edge 12, respectively. In other examples discussed in greater detail below, the input and outlet ports may be arranged differently, such as on two different sides that are not opposite one another or on the same side as one another. In some examples, the waveguide core 40 is arranged such that, where the core 40 meets the input port 15 or outlet port 16, the direction of extent 19 of the core 40 is at an acute angle θ relative to the edge 11 or 12 of the PDWA 10. More specifically, in some examples, 0°<θ<50°. This can help to reduce back-reflections and suppress on-chip lasing.

The operation of the PDWA 20 will be described in greater detail with reference to FIG. 3, which illustrates one optical system 70 in which the optical device 10 comprising the PDWA 20 can be utilized. The optical system 70 comprises a pump laser 50, a wavelength division multiplexing (WDM) coupler 51, and one or more isolators 52. The pump laser 50 produces a pump light $Pump_{fwd}$, which is configured to be absorbed by and excite the Pr atoms to an excited state. For example, the pump light $Pump_{fwd}$ may be laser light having a wavelength of approximately 980 nm. The WDM coupler 51 may receive the pump light $Pump_{fwd}$ and an O-band signal light $Sig_{in}$ and combine these into one combined light signal which is output to the isolator 52. The signal light $Sig_{in}$ comprises the encoded communications and is the signal which is intended to be amplified; the signal light $Sig_{in}$ and has a wavelength in the O-band (1260-1360 nm). The isolator 52 prevents any light traveling in a reverse direction (i.e., a direction opposite the direction of the $Sig_{in}$ light) from passing the isolator 52. Such light traveling in a reverse direction might include light reflected from a downstream component or spontaneous emission noise from the optical device 10. The isolator 52 allows light traveling in the forward direction (rightward in the figure) to pass. In some examples, the isolator 52 could be positioned between the pump laser 50 and WDM coupler 51. In some examples, a second isolator (not illustrated) is positioned on the other side of the optical device 10 and is arranged to block any reverse direction light coming from components downstream of the optical device 10.

The combined $Pump_{fwd}/Sig_{in}$ is then input to the PDWA 20 of the optical device 10. The pump light $Pump_{fwd}$ is absorbed by the Pr atoms in the core 40 of the PDWA 20, exciting electrons thereof to an excited state. The signal light $Sig_{in}$ then interacts with these excited-state Pr atoms and is amplified by stimulated emission. After emitting a photon, the excited state electrons drop to an intermediate state and quickly decay to the ground state by emitting phonons. The electrons of the Pr atoms are then re-excited by the pump light $Pump_{fwd}$, which may be continually passed through the PDWA 20, and the process described above repeats. Gain is achieved when population inversion between excited and intermediate states of the Pr atoms exceed a threshold set by the on-chip loss.

In some implementations, another pump laser 55 may be provided to provide pump light $Pump_{rvs}$ flowing in a reverse direction through the optical device 10, as shown in the optical system 170 of FIG. 4. This may be done to ensure that the full length of the PDWA 20 is excited. If only the forward pumping is used as in FIG. 3, then it may be possible for all of the pump light $Pump_{fwd}$ to be absorbed prior to reaching the far end of the PDWA 20, resulting in the Pr atoms in that region not being excited, thus potentially losing out on some amplification potential. In contrast, in the optical system 170 of FIG. 4, the reverse direction pump light $Pump_{rvs}$ ensures that the end portion of the PDWA 20 near the outlet port 16 is also fully excited, thus maximizing amplification. In this example, a second WDM coupler 54 may be provided which is configured to direct the $Pump_{rvs}$ onto the optical interconnect that is connected to the outlet port 16. This optical interconnect is the same one that carries the output signal $Sig_{out}$, although the pump light $Pump_{rvs}$ and the output signal $Sig_{out}$ will travel along this shared interconnect in opposite directions, as indicated by the arrows in FIG. 4. A second isolator 53 may also be provided between the WDM coupler 54 and the pump laser 55 and arranged to block light traveling in the forward direction (i.e., rightward in the figure).

Turning now to FIGS. 5-22, example optical devices 110, 210, 270, 310, 410, 510, 610, 710, 810, 910, 1010, 1110, 1210, 1310, 1410, 1510, 1610, and 1710 (or example optical systems comprising the same) will be described. These example optical devices comprise example configurations, implementations, variations, or modifications of the optical device 10 described above, and each has at least some components that are the same as or similar to components described above in relation to the optical device 10. In particular, each of these optical devices has at least one PDWA configured to amplifier O-band light, which is similar in structure and function to the PDWA 20 described above. However, the PDWAs of the various other optical devices described below may have differently shaped optical paths and/or the devices may also include additional components together with the PDWA. Unless otherwise noted (or otherwise illustrated), or unless it would be logically contradictory, the descriptions of the components of the optical device 10 above are also applicable to any of the similar components of the other example optical devices described below, and thus duplicative descriptions of these similar components is omitted below. The components of the optical devices described below which are the same as or similar to the above-described components are given reference numbers having the same last two digits (e.g., 40 and 140).

Figure 5:
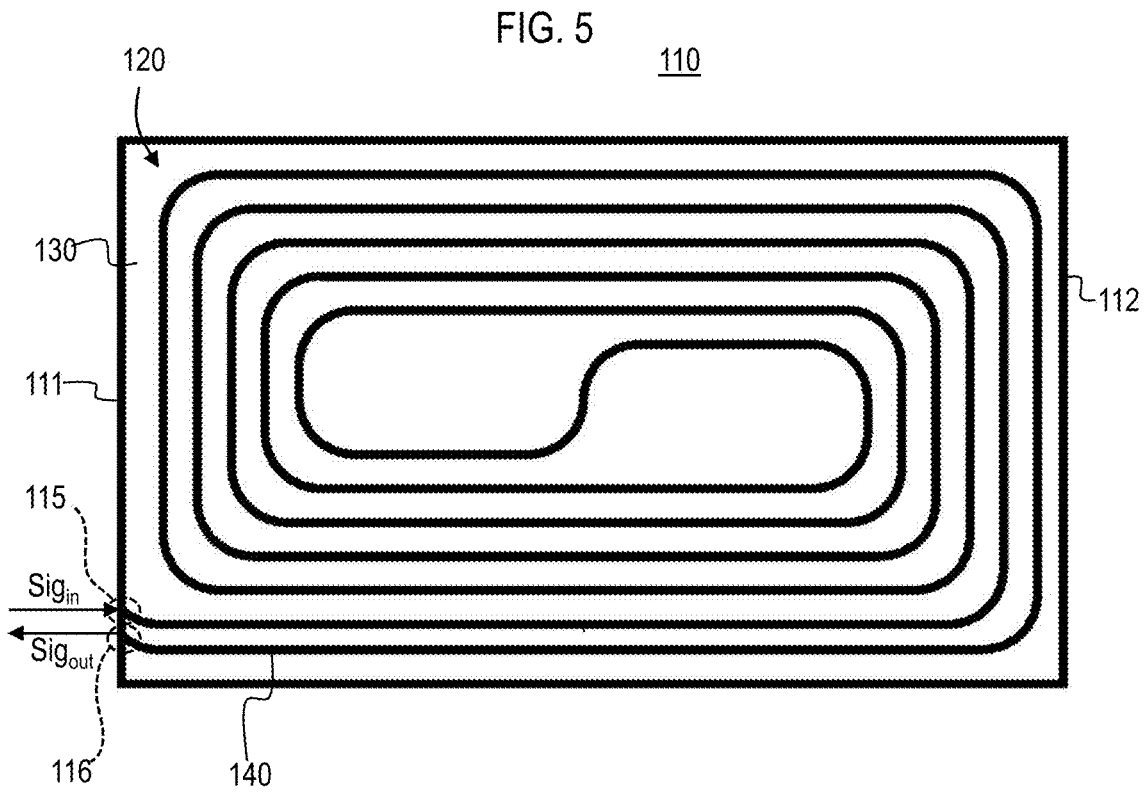
FIG. 5 is a schematic plan view of another example optical device comprising a waveguide optical amplifier with collocated input and output ports.

Turning now to FIG. 5, another example optical device 110 will be described. The optical device 110 comprises a PDWA 120 formed from waveguide cladding 130 and a Pr-doped waveguide core 140. The PDWA 120 is similar to the PDWA 20 described above except that in the PDWA 120, the input port 115 and output port 116 are disposed on the same edge of the optical device 110. That is, the input port 115 and the output port 116 are both disposed on the first edge 111 (and no ports are disposed on the second edge 112). In contrast, in the PDWA 10 the input port 15 is on the first edge 11 and the output port is on the second edge 12.

Figure 6:
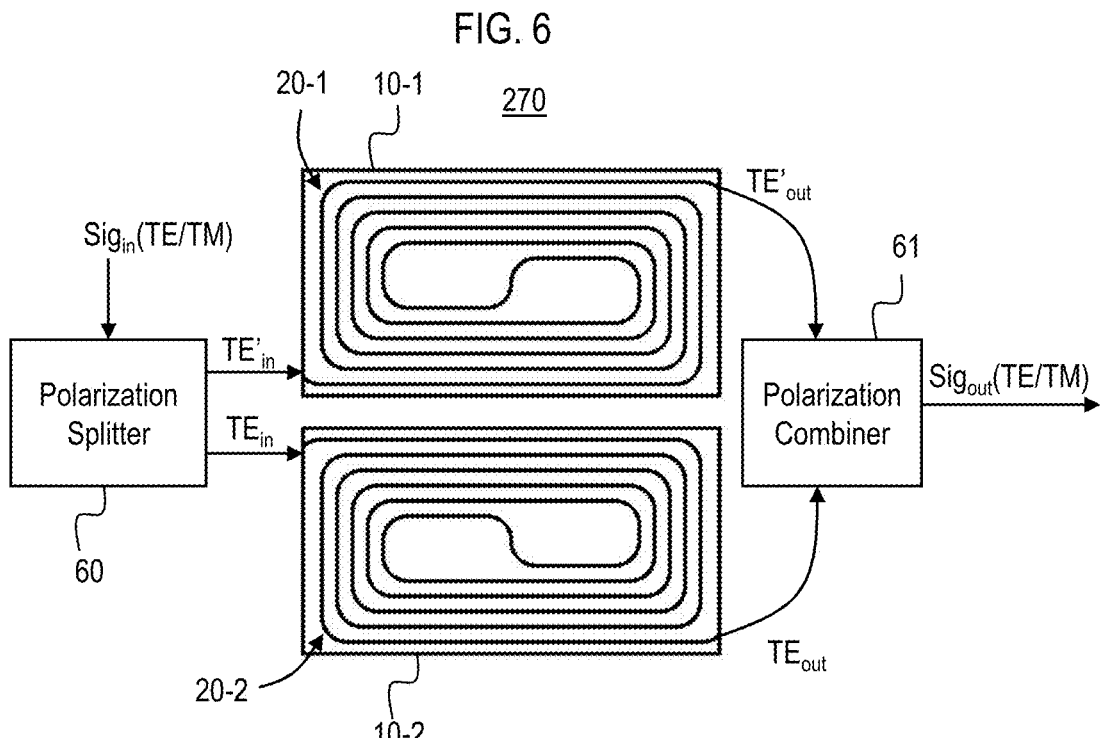
FIG. 6 is a block diagram illustrating another example optical circuit comprising an optical device and discrete polarization splitter and combiner.

Turning now to FIG. 6, another example optical system 270 configured to implement a polarization diversity scheme is described. The optical system 270 comprises two PDWAs 20 (i.e., PDWA 20-1 and 20-2, which in FIG. 6 are provided in the form of two separate optical devices 10 (i.e., optical devices 10-1 and 10-2). In other examples, the two PDWAs 20 may be provided as part of a single optical device, i.e., the two PDWAs 20 may be formed on the same chip/substrate. The system 270 is configured to be used with communication signals that utilize a polarization diversity scheme, in which different modes of the light signal (i.e., a TE mode and a TM mode) encode different information. Thus, the system 270 further comprises polarization splitter rotator 60, which is configured to receive the input light signal $Sig_{in}$ (TE/TM) having two polarization modes TE and TM, split off the TM mode to a different optical path than the TE mode, and rotate the split-off TM mode to form a second TE mode. In FIG. 6, the two TE modes are labeled $TE_{in}$, which corresponds to the original TE mode, and $TE'_{in}$, which corresponds to the second TE mode generated by splitting off and rotating the original TM mode. The two TE-mode signals are then sent through the two PDWA of the optical devices 10-1 and 10-2, respectively, are amplified thereby, and are output therefrom as amplified output signals $TE_{out}$ and $TE'_{out}$, respectively. The amplified output signals are then fed to a polarization rotator combiner 61, which rotates the amplified signal $TE_{out}$ into a TM mode and combines this TM mode with the amplified signal $TE'_{out}$ to generate the amplified output signal $Sig_{out}$ (TE/TM) which has both TE and TM modes like the original input signal, but amplified.

Note that the polarization splitter rotator 60 and the polarization rotator combiner 61 may both be formed from devices having essentially the same structure, but the devices can be made to perform different functions based on how the signals are input to them. For example, if a signal with combined TE/TM modes is fed as an input to a first port of the device, the device operates as a splitter rotator and outputs TE and TE' modes from two second ports (like the splitter rotator 60 described above); however, if instead two TE mode signals are input to the two second ports, the device operates as a rotator combiner and outputs a signal with combined TE/TM modes from the first port (like the rotator combiner 61 described above). Thus, in some examples, two identical instances of the same device may be used as the polarization splitter rotator 60 and the polarization rotator combiner 61, with the only differences therebetween being which signals are used as inputs and which ports those signals are input to. Some authors or manufacturers use the term polarization splitter rotator (or similar) as a generic name for all devices which can be used to split and rotate or rotate and combine polarized light, meaning they may use the term "polarization splitter rotator" (or similar) to refer to a device even when that device is arranged in a circuit for use as a rotator combiner. However, this convention is not followed herein, and instead the terms "polarization splitter rotator" and "polarization rotator combiner" are used to make it clearer how the devices are configured to be used.

The reason it may be needed, in some cases, to split off and rotate the TM mode is that the PDWA 20 may be polarization sensitive (TE and TM modes have different mode index and profiles), which means that different polarization dependent loss (PDL), polarization dependent dispersion (PDD), and time delays may occur, which may result in TM modes and TE modes becoming out of sync when passed through the PDWAs 20, which may disrupt the recoverability of the encoded information from the light signal. By splitting the modes, converting the TM mode to TE, and passing both through identical PDWAs 20, the same losses, dispersion, and time delays are experienced by both branches, ensuring that in the output signal the encoded information is not disrupted.

In some examples, the rotation of the TM mode into TE mode may be achieved by splitting the TM and TE modes into separate optical fibers and physically rotating the optical fiber that carries the TM mode. In other examples, a bulk optical device may be used in place of optical fibers, such as a polarization walk-off crystal or a polarization beamsplitter/combiner.

Figure 7:
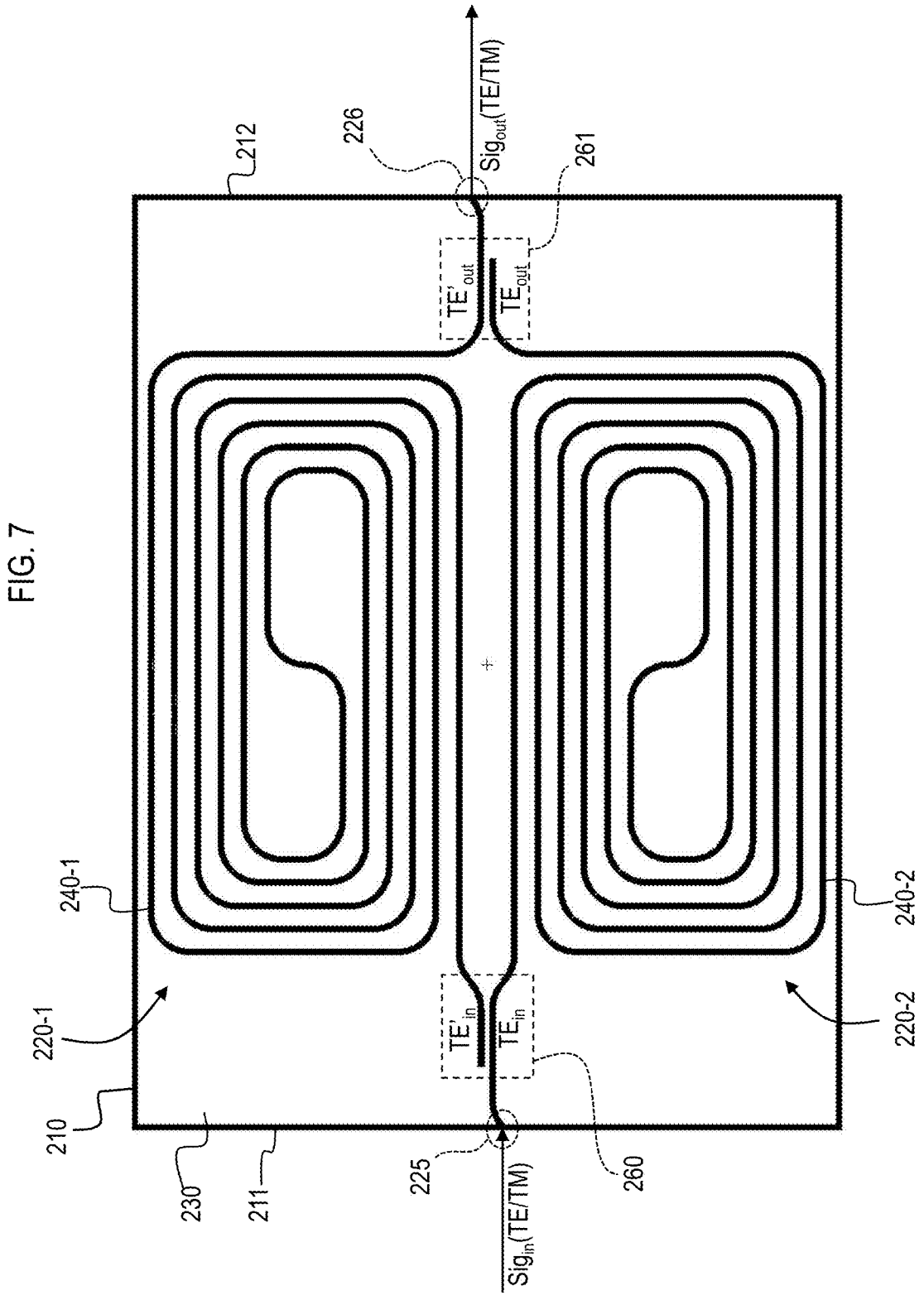
FIG. 7 is schematic plan view of another example optical device comprising waveguide optical amplifiers with integrated polarization splitter and combiner.

Turning now to FIG. 7, another optical device 210 will be described. The optical device 210 comprises two PDWAs 220 (i.e., PDWAs 220-1 and 220-2) formed on the same silicon substrate (not illustrated), or in other words integrated together as part of the same chip. The PDWAs 220-1 and 220-2 are formed from a shared waveguide cladding 230 and two Pr-doped waveguide cores 240-1 and 240-2. (The waveguide cladding 230 is described as "shared" in the sense that the same layer of material may form the cladding for both PDWA, but in practice different portions of the cladding 230 layer may act as the cladding for the respective PDWA, specifically those portions of the cladding 230 which directly abut the respective cores 240-1 and 240-1 may act as the cladding for the respective PDWA 220-1 and 220-2.) The first PDWA 220-1 may be similar to the PDWA 20 described above, and the second PDWA 220-2 may also be similar to the PDWA 220-1, except with a mirrored optical path (e.g., mirrored across a longitudinal centerline of the device 210). The optical device 210 further comprises integrated polarization splitter rotator 260 and polarization rotator combiner 261, which are formed on the same substrate (as part of the same chip) as the PDWAs 220-1 and 220-2. The optical device 210 may be similar in function to the optical system 270 of FIG. 6 in that the optical device 210 implements a polarization diversity scheme, but differs from the optical system 270 in that, in the optical device 210, the polarization components and the two PDWA are formed as part of the same chip (i.e., the same photonic integrated circuit). An input port 225 receives the light signal Sig$_{in}$ (TE/TM) which passes into the integrated polarization splitter rotator 260. The integrated polarization splitter rotator 260 splits off the TM mode and rotates it into the TE'$_{in}$ mode. The original TE$_{in}$ mode proceeds down the PDWA 220-2, while the split-and-rotated TE'$_{in}$ mode proceeds down the PDWA 220-1. These signals are amplified as they pass through the PDWA 220-1 and 220-2, and then the amplified signals TE'$_{out}$ and TE$_{out}$ are recombined at the integrated polarization rotator combiner 261 into the amplified output signal Sig$_{out}$ (TE/TM), with TE$_{out}$ being converted into TM mode in the combined output signal.

The polarization splitter rotator 260 and polarization rotator combiner 261 may be formed by arranging the core waveguide portions 240-1 and 240-2 in the region of the splitter rotator 260 or rotator combiner 261 so that they extend parallel to one another and a separation distance therebetween is small, which causes optical coupling and rotation of the TM mode from one core portion 240 to the other. One of ordinary skill in the art would be familiar with how to form a splitter rotator or rotator combiner by coupling two waveguides in this manner, and thus further details regarding this are omitted. As the combined input signal Sig$_{in}$(TE/TM) passes through the core 240-2 within the splitter 260, the TM mode is coupled over to the adjacent core portion 240-1 and rotates into the TE'$_{in}$ signal. Conversely, as the TE$_{out}$ mode travels through the combiner 261, it is coupled over to the core 240-1, causing the TE$_{out}$ signal to rotate into the TM mode.

Figure 8:
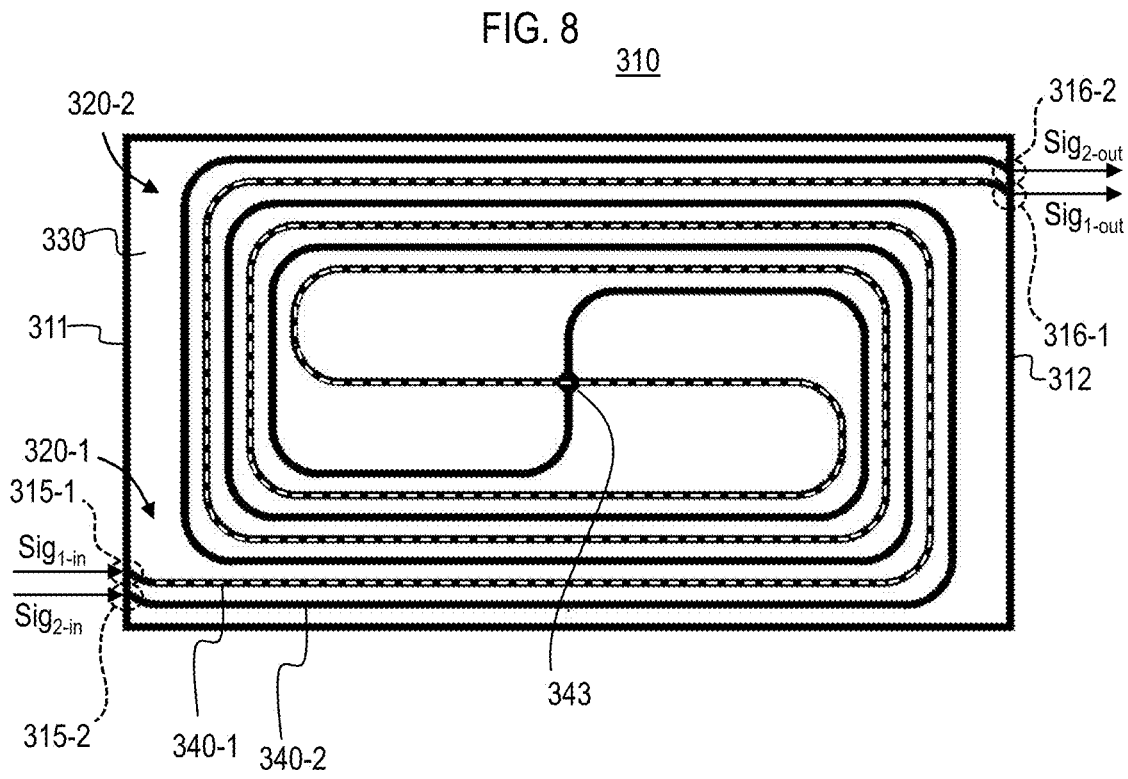
FIG. 8 is a schematic plan view of another example optical device comprising multiple waveguide optical amplifiers with interleaved waveguides.
Figure 9:
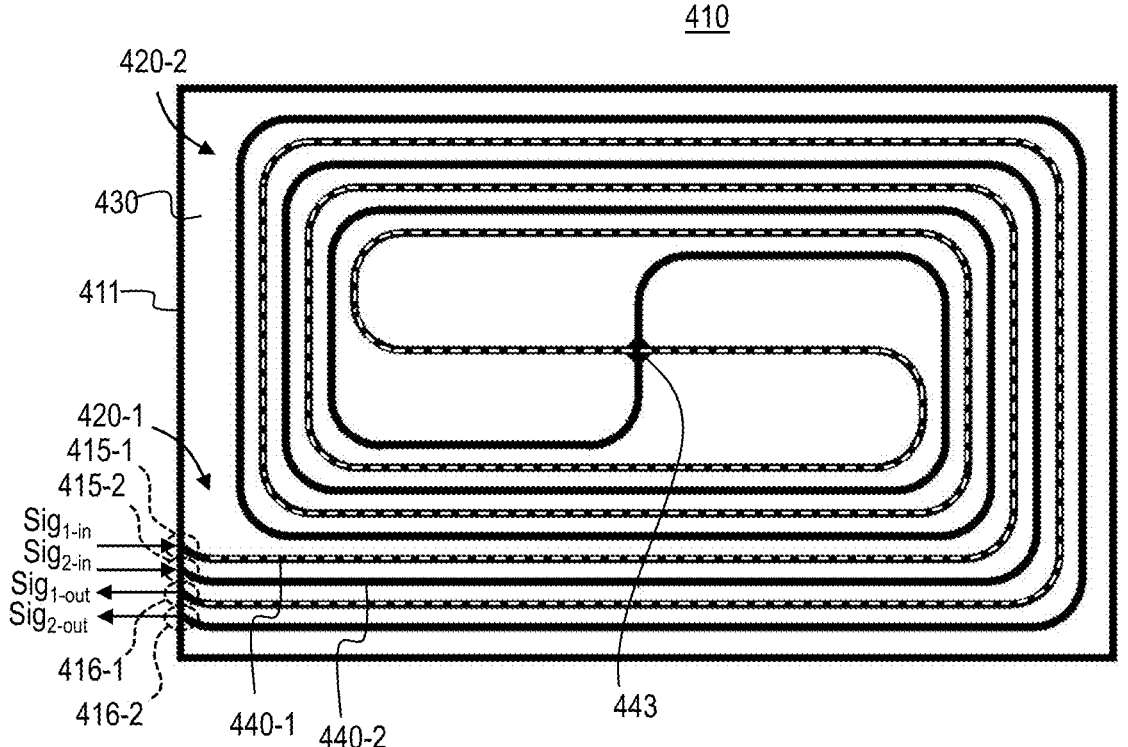
FIG. 9 is a schematic plan view of another example optical device comprising multiple waveguide optical amplifiers with interleaved waveguides and collocated inputs and outputs.
Figures 10, 11:
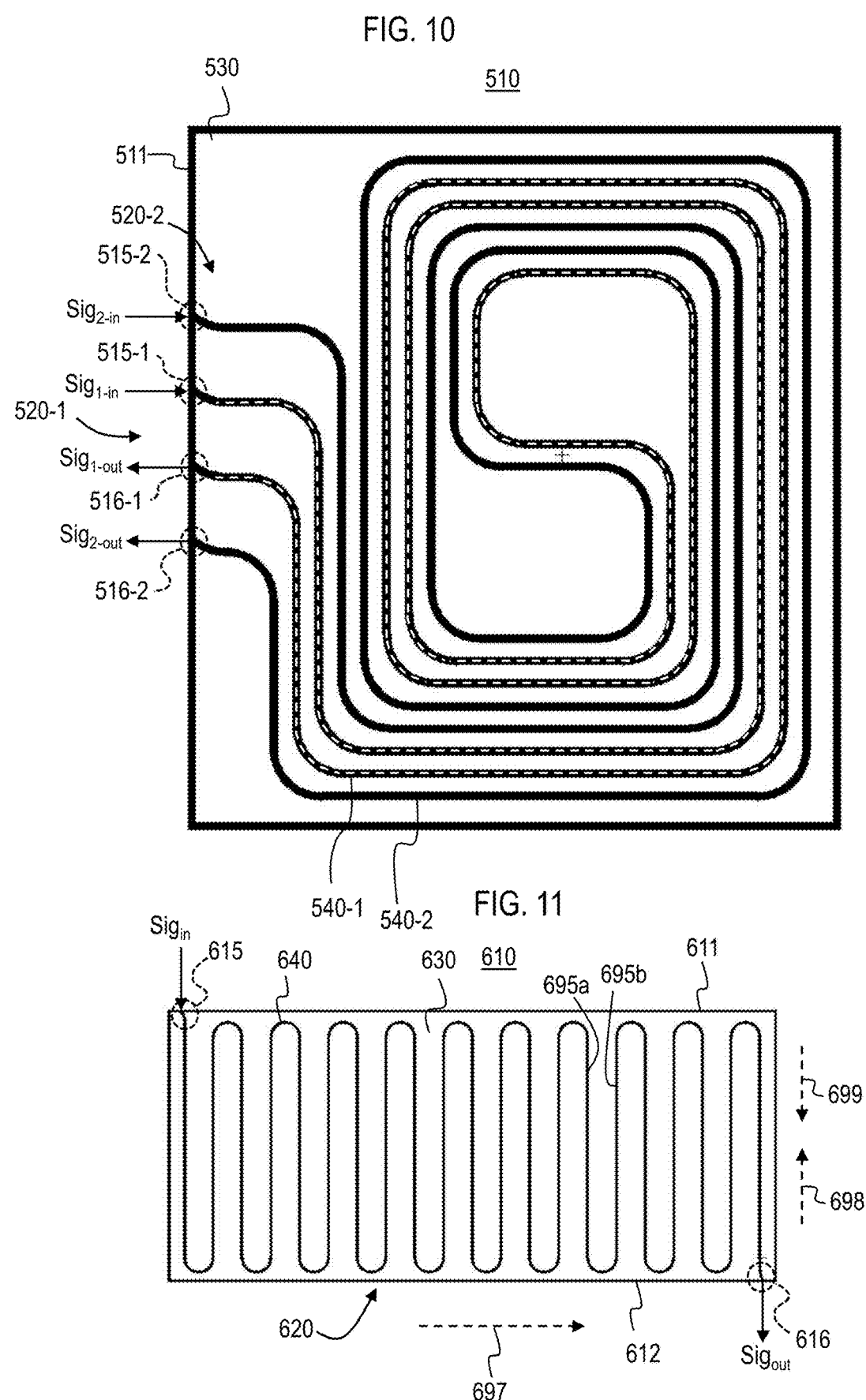
FIG. 10 is a schematic plan view of another example optical device comprising multiple waveguide optical amplifiers with interleaved waveguides and collocated inputs and outputs.
FIG. 11 is a schematic plan view of another example optical device comprising a waveguide optical amplifier with a serpentine waveguide.

Turning to FIGS. 8-10, additional example optical devices will be described which comprise two PDWAs (similar to the PDWA 20 or 120 described above), which are disposed in essentially the same two-dimension area of the optical device (in a plan view) and within the same vertical layer as one another. Such an arrangement in which two PDWAs are formed in the same general area is facilitated by interleaving the spiraling optical paths thereof, forming a parallel interleaved double spiral shape.

For example, FIG. 8 illustrates an example optical device 310. The optical device 310 comprises PDWAs 320-1 and 320-2. The PDWAs 320-1 and 320-2 have waveguide core portions 340-1 and 340-2 that are arranged to form parallel interleaved double spirals, as shown in FIG. 8. In FIG. 8, one of the core portions 340-1 is shown with dashed lines to make it easier to distinguish from the core portion 340-2. The same cladding layer 330 may be shared by both PDWAs 320-1 and 320-2. The functioning and other aspects of the PDWAs 320-1 and 320-2 may be similar to the PDWA 20 described above, and thus duplicative description thereof is omitted.

In the optical device 310, there are two input ports 315-1 and 315-2 to receive two 0-band input light signals Sig$_{in-1}$ and Sig$_{in-2}$, which are directed along the core portions 340-1 and 340-2, respectively. The signals are amplified and then the amplified signals Sig$_{out-1}$ and Sig$_{out-2}$ are output via the output ports 316-1 and 316-2, respectively. In this example, the input ports 315-1 and 315-2 are disposed on the first edge

311 of the optical device 310, whereas the output ports 316-1 and 316-2 are disposed on the second edge 312 of the optical device 310.

In the optical device 310, an adiabatic crossing 343 may be located in the center of the parallel interleave double spirals. The adiabatic crossing 343 comprises an intersection between the waveguide core portions 340-1 and 340-2. The intersection is at a right angle and is designed to avoid losses or crosstalk between the core portion 340-1 and 340-2, as would be familiar to those of ordinary skill in the art.

FIG. 9 illustrates another optical device 410. The optical device 410 comprises two PDWAs 420-1 and 420-2 having parallel interleaved double spiral waveguide core portions 440-1 and 440-2, respectively, and a shared waveguide cladding 430. The optical device 410 may be similar to the optical device 310 except that in the optical device 410, the input ports 415-1 and 415-2 are located on the same edge 411 as the output ports 416-1 and 416-2. An adiabatic crossing 443 is also present.

FIG. 10 illustrates another optical device 510. The optical device 510 comprises two PDWAs 520-1 and 520-2 having parallel interleaved double spiral waveguide core portions 540-1 and 540-2, respectively, and a shared waveguide cladding 530. The optical device 450 may be similar to the optical device 410 in that the input ports 515-1 and 515-2 are located on the same edge 511 as the output ports 516-1 and 516-2. However, the optical device 510 may differ from the optical device 410 in that no adiabatic crossing is present. Moreover, in the optical device 510, the sequence of the ports 515 and 516 differs from the sequence of ports 415 and 416 in the optical device 410. That is, in the optical device 510, the ports are arranged in the order (from top to bottom) 515-2 (Sig$_{2-in}$), 515-1 (Sig$_{1-n}$), 516-1 (Sig$_{1-out}$), and 516-2 (Sig$_{2-out}$), whereas the optical device 410 the ports are arranged in the order (from top to bottom), 415-1 (Sig$_{1-in}$), 415-2 (Sig$_{2-in}$), 416-1 (Sig$_{1-out}$), and 416-2 (Sig$_{2-out}$). Note that the differences between the two devices in which ports have a "1" or a "2" index are not what is relevant here, as these indexes are arbitrarily assigned and could be reversed. What is salient here is how the ports are arranged relative to one another within the respective devices. In particular, in the optical device 510, the input and output ports of the PDWA 520-1 are both located adjacent to one another (i.e., with no other ports located therebetween), and the input and output ports of the PDWA 520-2 have both of the PDWA 520-1 ports located therebetween. In contrast, in optical device 410 the respective pairs of input and output ports of the PDWAs 420-1 and 420-2 are interleaved with each input/output pair having one port of the other input/pair disposed therebetween.

FIG. 11 illustrates another optical device 610. The optical device 610 comprises a PDWA 620 formed from a Pr-doped waveguide core 640 and waveguide cladding 630. The PDWA 620 may be similar in construction and operation to the PDWA 20, except that the waveguide core 640 of the PDWA 620 defines an optical path having a serpentine shape, instead of a double spiral shape. A serpentine shape refers to a shape which follows a path that generally extends along a first direction (e.g., direction 697) but which comprises repeating transverse segments which extend transverse to the first direction. The repeating transverse segments are spaced apart along the first direction, with successive transverse sections being joined together by 180 degree turns. Moreover, the 180 degree turns alternate in direction with each successive turn, and thus the path extends in alternating opposite directions with each successive transverse section. For example, in FIG. 11, if the path is traversed from input port 615 to output port 616, the path extends along direction 699 while passing through transverse section 695a while extending along direction 698 while passing through the next successive transverse section 695b. Although FIG. 11 illustrates the 180 degree turns as being a single smooth curve, this is not required; in some examples, the 180 degree turns can be formed from multiple curved smaller segments that collectively form a 180 degree turn, with intermediate portions between the smaller curved segments. For example, two 90 degree turns connected together by an intermediate straight segment may form one of the aforementioned 180 degree turns. Note that the transverse sections can be of any length, and do not necessarily have to be parallel to one another or perfectly perpendicular to the first direction. In some examples, the successive alternating 180 degree turns may be coupled directly to one another with no transverse sections therebetween, and this may also be regarded as a serpentine shape. Although not illustrated, in some examples, the PDWA may form a double serpentine path, which has a first serpentine segment which extends generally in a first direction and then a second serpentine segment which doubles back and extends generally in a second direction opposite to the first direction, so that the input and output ports may be on a same side of the device instead of opposite sides. In some examples with a double serpentine path, the two segments may be interleaved.

Turning now to FIG. 12-22, various optical devices 710, 810, 910, 1010, 1110, 1210, 1310, 1410, 1510, 1610, and 1710 (or example optical systems comprising the same) will be described. As already noted above, these optical devices are configurations, implementation, variations, and/or modifications of optical devices described above, including optical device 10. These additional optical devices are similar to the optical device 10 in that they comprise PDWA formed, on a silicon substrate, from a Pr-doped Si3N4 waveguide core portion with SiO2 cladding. These additional optical devices differ from previously described optical devices in that the additional optical devices further comprise undoped waveguide core portions which are formed on the same silicon substrate as the doped waveguide core portions. The undoped core portions may be used to form various integrated optical components which may be coupled to the PDWA, thus forming a photonic integrated optical circuit.

Turning now to FIG. 12, an optical device 710 will be described. The optical device 710 comprises a waveguide comprising a first waveguide core portion 740 and a second waveguide core portion 745 formed in the same vertical layer as one another, with cladding 730. The first waveguide core portion 740 comprises Pr-doped Si3N4, similar to the waveguide portion 40 described above. Moreover, the first waveguide core portion 740 together with the cladding 730 (which is similar to cladding 30) form a PDWA 720, which may be similar to the PDWA 20 or any of the other PDWAs described above. However, the second waveguide core portion 745 differs from the first waveguide core portion 740 in that the second waveguide core portion 745 is undoped. That is, the second waveguide core portion 745 may comprise undoped Si3N4. This second waveguide core portion 745 may be used to form another optical component on the same chip as the PDWA 720 formed by the first waveguide core portion 740. Thus, the optical device 710 may comprise a photonic integrated circuit. This other optical component may comprise, for example, a WDM coupler, a polarization splitter, or other optical component, as will be described in greater detail below.

The particular dimensions of the core portions 740 and 745 and the distances between the portions 740 and 745 can vary from one device to the next depending on materials chosen and design constraints. In some examples, the distance between core portions 740 and 745 is about 0.5 μm to 1 μm in regions where coupling between the cores is desired (such as in cases in which a WDM coupler is formed from the two core portions), whereas the distance between core portions 740 and 745 may be greater than 1 μm in regions where coupling between the cores is not desired.

Figure 13:
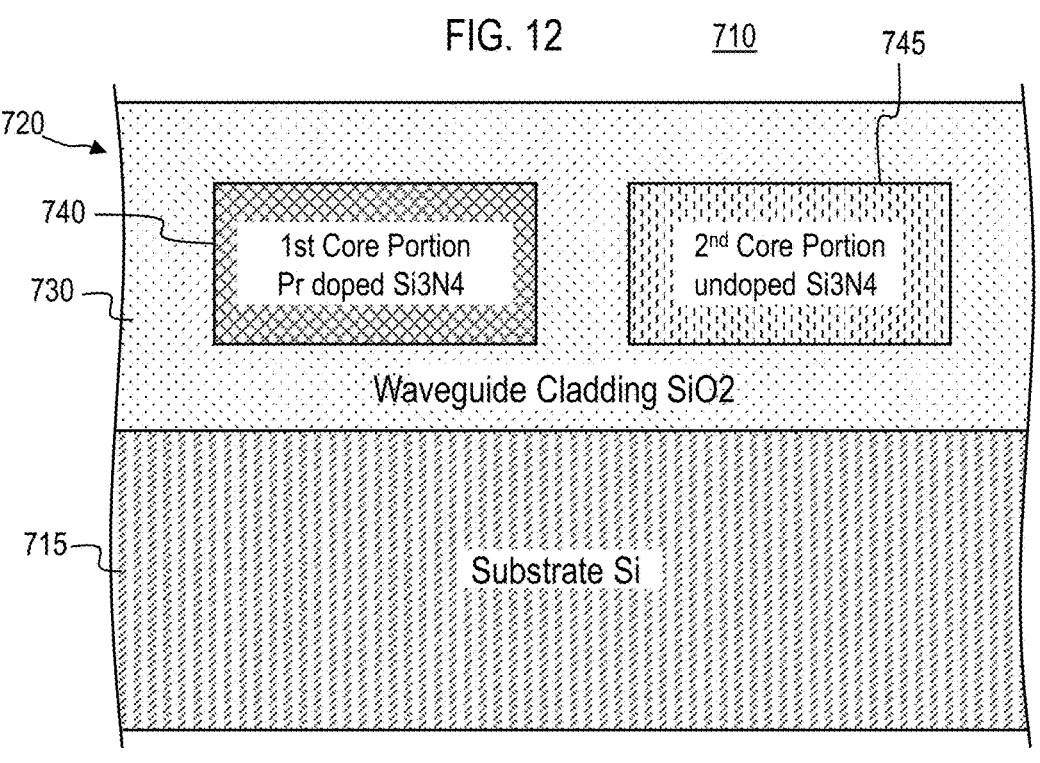
FIG. 13 is a schematic cross-section of another example optical device comprising a waveguide optical amplifier comprising a doped core portion and an undoped core portion in different vertical layers.

Turning now to FIG. 13, an optical device 810 will be described. Like the optical device 710, the optical device 810 comprises a waveguide comprising a first waveguide core portion 840 and a second waveguide core portion 846 wherein the first waveguide core portion 840 is Pr-doped Si3N4 and the second waveguide core portion 846 is undoped Si3N4. However, unlike the optical device 710, in the optical device 810 the first and second waveguide portions 840 and 846 are formed in different vertical layers. Both doped and undoped core portions 840 and 846 are at least partially surrounded by cladding 830. In some examples, the same material is used for the cladding 830 of both doped and undoped core portions 840 and 846, while in other examples (not illustrated) different materials may be used as the cladding for the doped and undoped core portions 840 and 846, respectively.

In some examples, an optical device may comprise a doped waveguide core (similar to first waveguide core portions 740 or 840) and multiple undoped waveguide portions (similar to the second waveguide portions 745 and/or 846), with at least one of the undoped waveguide core portions being provided in the same vertical layer as the doped core portion and at least one undoped waveguide core portion being provided in a different layer than the doped waveguide core portion. In other words, in some examples, the configurations illustrated in FIGS. 12 and 13 may be combined together within the same optical device. Two non-limiting examples of this are found in FIGS. 21 and 22, which are described in turn below.

In addition, in some examples (not illustrated), a doped and undoped cladding may be used in the optical devices. For example, the doped waveguide core may be abutted by a doped cladding region on one or more sides thereof, whereas undoped cladding regions may be provided elsewhere in the device (e.g., adjacent other sides of the waveguide core, or adjacent undoped waveguide cores elsewhere in the optical device).

The particular dimensions of the core portions 840 and 846 and the vertical distances between the portions 840 and 846 can vary from one device to the next depending on materials chosen and design constraints. In some examples, the distance between core portions 840 and 846 is about 0.5 μm to 1 μm in regions where coupling between the cores is desired (such as in cases in which a WDM coupler is formed from the two core portions), whereas the distance between core portions 840 and 846 may be greater than 1 μm in regions where coupling between the cores is not desired.

Figure 14:
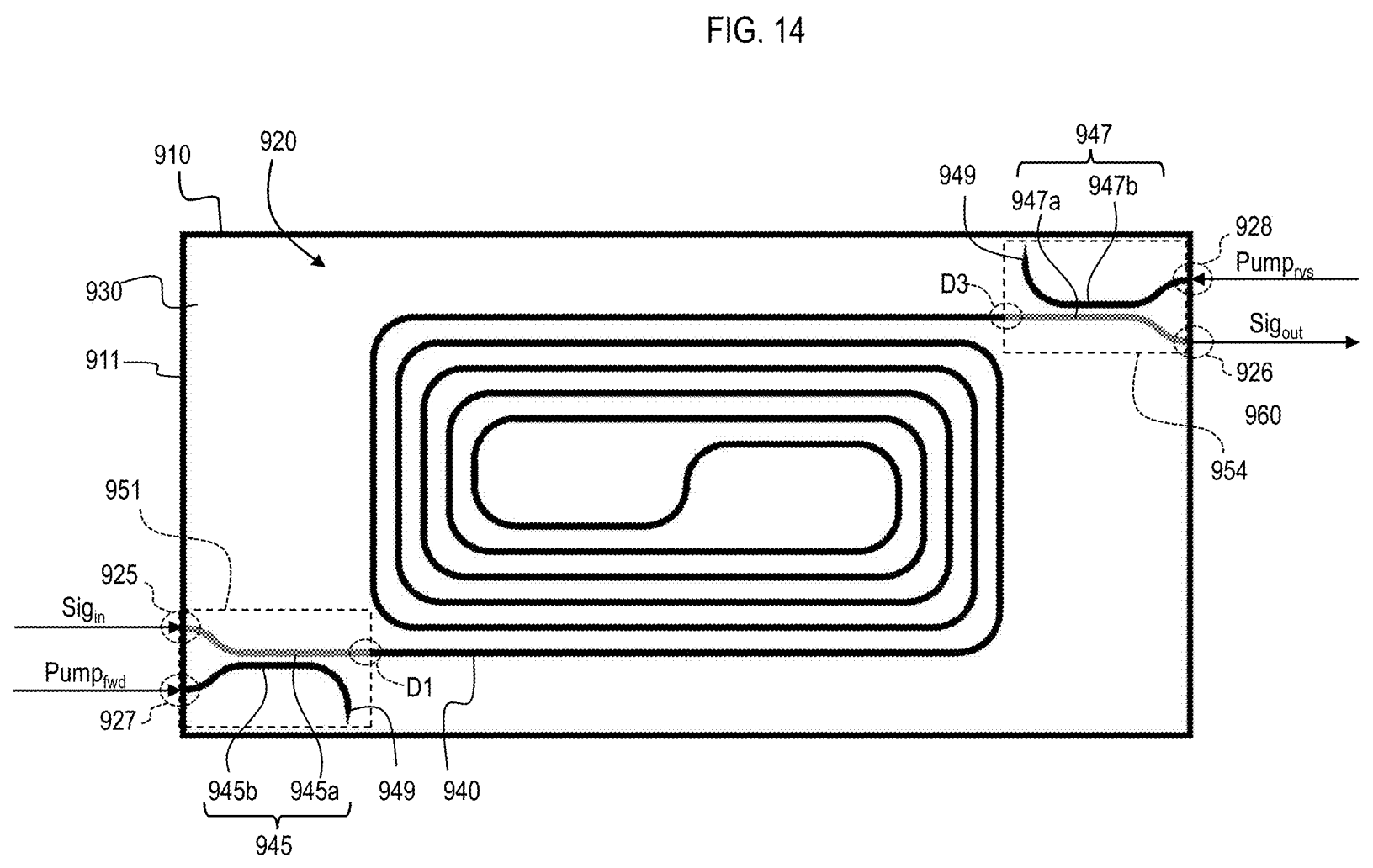

Turning now to FIG. 14, an optical device 910 will be described. The optical device 910 is one configuration example of the optical device 710. The optical device 910 comprises a PDWA 920 together with two WDM couplers 951 and 954, which are all integrated together on the same chip. The PDWA 920 is formed in part by a Pr-doped waveguide core 940, which is one example implementation of the first waveguided core portion 740 described above in relation to FIG. 12. The WDM couplers 951 and 954, on the other hand, are formed from undoped waveguide core portions 945 and 947, which are formed in the same vertical layer as the doped waveguide core 940. These undoped waveguide core portions 945 and 947 are example implementations of the second waveguided core portion 745 described above in relation to FIG. 12.

More specifically, the WDM coupler 951 is formed from two undoped waveguide core portions 945, namely undoped core portions 945*a* and 945*b*. The undoped core portion 945*a* is coupled to signal input port 925, which is configured to receive the communication signal Sig$_{in}$ which is to be amplified. The undoped core portion 945*b* is coupled to pump input port 927, which is configured to receive the forward pump light Pump$_{fwd}$. The undoped core portions 945*a* and 945*b* then are arranged to extend parallel to and close to one another for a certain distance, which causes the pump light Pump$_{fwd}$ to couple over from the undoped core portion 954*b* into the undoped core portion 945*a*. The particular dimensions of these portions and the distance between the portions can vary from one device to the next depending on materials chosen and design constraints. In some examples, the distance between core portions 954*a* and 954*b* in the coupling region thereof is about 0.5 µm to 1 µm. The undoped core portion 945*b* may then terminate in a pump scatter region 949 which scatters any of the pump light Pump$_{fwd}$ which happens to have not been coupled over to the undoped core portion 945*a*. The WDM coupler 951 may also be referred to as an input WDM coupler 951, because it receive the input light signal Sig$_{in}$.

Similarly, the WDM coupler 954 is formed from two undoped waveguide core portions 947, namely undoped core portions 947*a* and 947*b*. The undoped core portion 947*a* is coupled to signal output port 926, which is configured to output the amplified communication signal Sig$_{out}$. The undoped core portion 947*b* is coupled to reverse pump input port 928, which is configured to receive the reverse pump light Pump$_{rvs}$. The undoped core portions 947*a* and 947*b* then are arranged to extend parallel to and close to one another for a certain distance, which causes the pump light Pump$_{rvs}$ to couple over from the undoped core portion 947*b* into the undoped core portion 947*a*. The particular dimensions of these portions and the distance between the portions can vary from one device to the next depending on materials chosen and design constraints. In some examples, the distance between core portions 957*a* and 957*b* in the coupling region thereof is about 0.5 µm to 1 µm. The undoped core portion 947*b* may then terminate in a pump scatter region 949 which scatters any of the pump light Pump$_{rvs}$ which happens to have not been coupled over to the undoped core portion 947*a*. The WDM coupler 954 may also be referred to as an output WDM coupler 954, because it outputs the amplified output light signal Sig$_{out}$.

The doped core portion 940 is coupled to the undoped core portions 945*a* and 947*a* at junction points D1 and D3. In some examples, the doped core portion 940 and the undoped core portions 945*a* and 947*a* may all be formed from a single continuous body of Si3N4, with the portions differing in that dopants were added to the core portion 940 but not the others.

As signal light Sig$_{in}$ and forward pump light Pump$_{fwd}$ enter the input WDM coupler 951, they are combined together into the undoped core portion 945*a*. This combined light then exits the WDM coupler 951 and enters the core portion 940 of the PDWA 920 via junction point D1. After being amplified by the PDWA 920, the amplified signal light Sig$_{out}$ then exits the core portion 940 of the PDWA 920 at junction point D3 and enters undoped core portion 947*a* of the WDM coupler 954. From there, the amplified signal light Sig$_{out}$ exits the optical device 920 via signal output port 926. Simultaneously with the above, the reverse pump light Pump$_{rvs}$ is being pumped into the PDWA 920 in a reverse direction via the output WDM coupler 954.

Although FIG. 14 illustrates an optical device 910 that utilizes reverse pumping and thus has an integrated output WDM coupler 954, other example optical devices may utilize only forward pumping and may have only an integrated input WDM coupler similar to the WDM coupler 925 while omitting an output WDM coupler.

Figures 15, 16, 17:
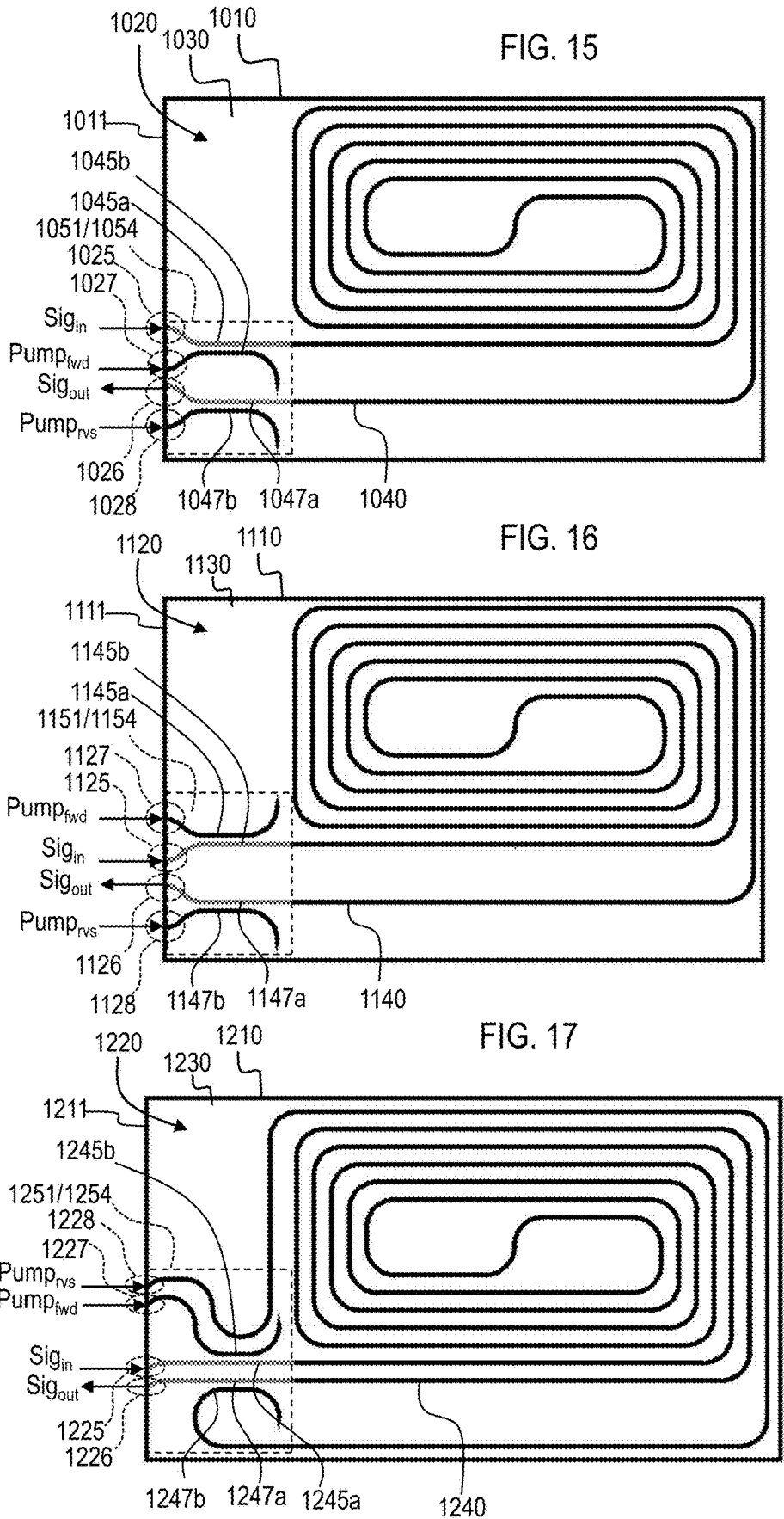
FIG. 15 is a schematic plan view of another example optical device comprising a waveguide optical amplifier with integrated WDM combiners and a doped core portion and an undoped core portion in a same vertical layer.
FIG. 16 is a schematic plan view of another example optical device comprising a waveguide optical amplifier with integrated WDM combiners and a doped core portion and an undoped core portion in a same vertical layer.
FIG. 17 is a schematic plan view of another example optical device comprising a waveguide optical amplifier with integrated WDM combiners and a doped core portion and an undoped core portion in a same vertical layer.

Turning now to FIG. 15, another optical device 1010 will be described, which is another example configuration of the optical device 710. The optical device 1010 is similar to the optical device 910 described above, except that the signal output port 1026 and reverse pump input port 1028 are located on the same edge 1011 of the device 1010 as the signal input port 1025 and the forward pump input port 1027, and consequently the output WDM coupler 1054 is also provided on a same side of the device 1010 as the input 1051.

The optical device 1010 comprises a PDWA 1020 together with two WDM couplers 1051 and 1054, which are all integrated together on the same chip. The PDWA 1020 is formed in part by a Pr-doped waveguide core 1040, which is one example implementation of the first waveguided core portion 740 described above, and cladding 1030. The WDM couplers 1051 and 1054, on the other hand, are formed from undoped waveguide core portions 1045 and 1047, which are formed in the same vertical layer as the doped waveguide core 1040. These undoped waveguide core portions 1045 and 1047 are example implementations of the second waveguided core portion 745 described above in relation to FIG. 12, and are similar in structure and function to the WDM couplers 951 and 947 described above. More specifically, the WDM coupler 1051 is formed from two undoped waveguide core portions 1045, namely undoped core portions 1045*a* and 1045*b*. The undoped core portion 1045*a* is coupled to signal input port 1025, which is configured to receive the communication signal Sig$_{in}$ which is to be amplified. The undoped core portion 1045*b* is coupled to pump input port 1027, which is configured to receive the forward pump light Pump$_{fwd}$. Similarly, the WDM coupler 1054 is formed from two undoped waveguide core portions 1047, namely undoped core portions 1047*a* and 1047*b*. The undoped core portion 1047*a* is coupled to signal output port 1026, which is configured to output the amplified communication signal Sig$_{out}$. The undoped core portion 1047*b* is coupled to reverse pump input port 1028, which is configured to receive the reverse pump light Pump$_{rvs}$.

Turning now to FIG. 16, another optical device 1110 will be described, which is another example configuration of the optical device 710. The optical device 1110 is similar to the optical device 1010 described above, except that the input WDM coupler 1151 has an orientation that is flipped (mirrored) with respect to the input WDM coupler 1051 of the device 1010. This arrangement allows the signal input and output ports 1125 and 1127 to be located next to one another along the edge 1111.

The optical device 1110 comprises a PDWA 1120 together with two WDM couplers 1151 and 1154, which are all integrated together on the same chip. The PDWA 1120 is formed in part by a Pr-doped waveguide core 1140, which is one example implementation of the first waveguided core portion 740 described above, and cladding 1130. The WDM couplers 1151 and 1154, on the other hand, are formed from undoped waveguide core portions 1145 and 1147, which are formed in the same vertical layer as the doped waveguide core 1140. These undoped waveguide core portions 1145 and 1147 are example implementations of the second waveguided core portion 745 described above in relation to FIG. 12, and are similar in structure and function to the WDM couplers 951 and 947 described above. More specifically, the WDM coupler 1151 is formed from two undoped waveguide core portions 1145, namely undoped core portions 1145a and 1145b. The undoped core portion 1145a is coupled to signal input port 1125, which is configured to receive the communication signal $\text{Sig}_{in}$ which is to be amplified. The undoped core portion 1145b is coupled to pump input port 1127, which is configured to receive the forward pump light $\text{Pump}_{fwd}$. Similarly, the WDM coupler 1154 is formed from two undoped waveguide core portions 1147, namely undoped core portions 1147a and 1147b. The undoped core portion 1147a is coupled to signal output port 1126, which is configured to output the amplified communication signal $\text{Sig}_{out}$. The undoped core portion 1147b is coupled to reverse pump input port 1128, which is configured to receive the reverse pump light $\text{Pump}_{rvs}$.

Turning now to FIG. 17, another optical device 1210 will be described, which is another example configuration of the optical device 710. The optical device 1210 is similar to the optical device 1010 described above, except that in the device 1210 the forward and reverse pump input ports 1227 and 1228 are located adjacent to one another while the signal input and output ports 1225 and 1226 are located adjacent to one another. This arrangement of the ports is achieved by wrapping the undoped core portion 1247b around the perimeter of the PDWA 1240 so that it can be brought adjacent to the undoped core portion 1247a.

The optical device 1210 comprises a PDWA 1220 together with two WDM couplers 1251 and 1254, which are all integrated together on the same chip. The PDWA 1220 is formed in part by a Pr-doped waveguide core 1240, which is one example implementation of the first waveguided core portion 740 described above, and cladding 1230. The WDM couplers 1251 and 1254, on the other hand, are formed from undoped waveguide core portions 1245 and 1247, which are formed in the same vertical layer as the doped waveguide core 1240. These undoped waveguide core portions 1245 and 1247 are example implementations of the second waveguided core portion 745 described above in relation to FIG. 12, and are similar in structure and function to the WDM couplers 951 and 947 described above. More specifically, the WDM coupler 1251 is formed from two undoped waveguide core portions 1245, namely undoped core portions 1245a and 1245b. The undoped core portion 1245a is coupled to signal input port 1225, which is configured to receive the communication signal $\text{Sig}_{in}$ which is to be amplified. The undoped core portion 1245b is coupled to pump input port 1227, which is configured to receive the forward pump light $\text{Pump}_{fwd}$. Similarly, the WDM coupler 1254 is formed from two undoped waveguide core portions 1247, namely undoped core portions 1247a and 1247b. The undoped core portion 1247a is coupled to signal output port 1226, which is configured to output the amplified communication signal $\text{Sig}_{out}$. The undoped core portion 1247b is coupled to reverse pump input port 1228, which is configured to receive the reverse pump light $\text{Pump}_{rvs}$.

Figure 18:
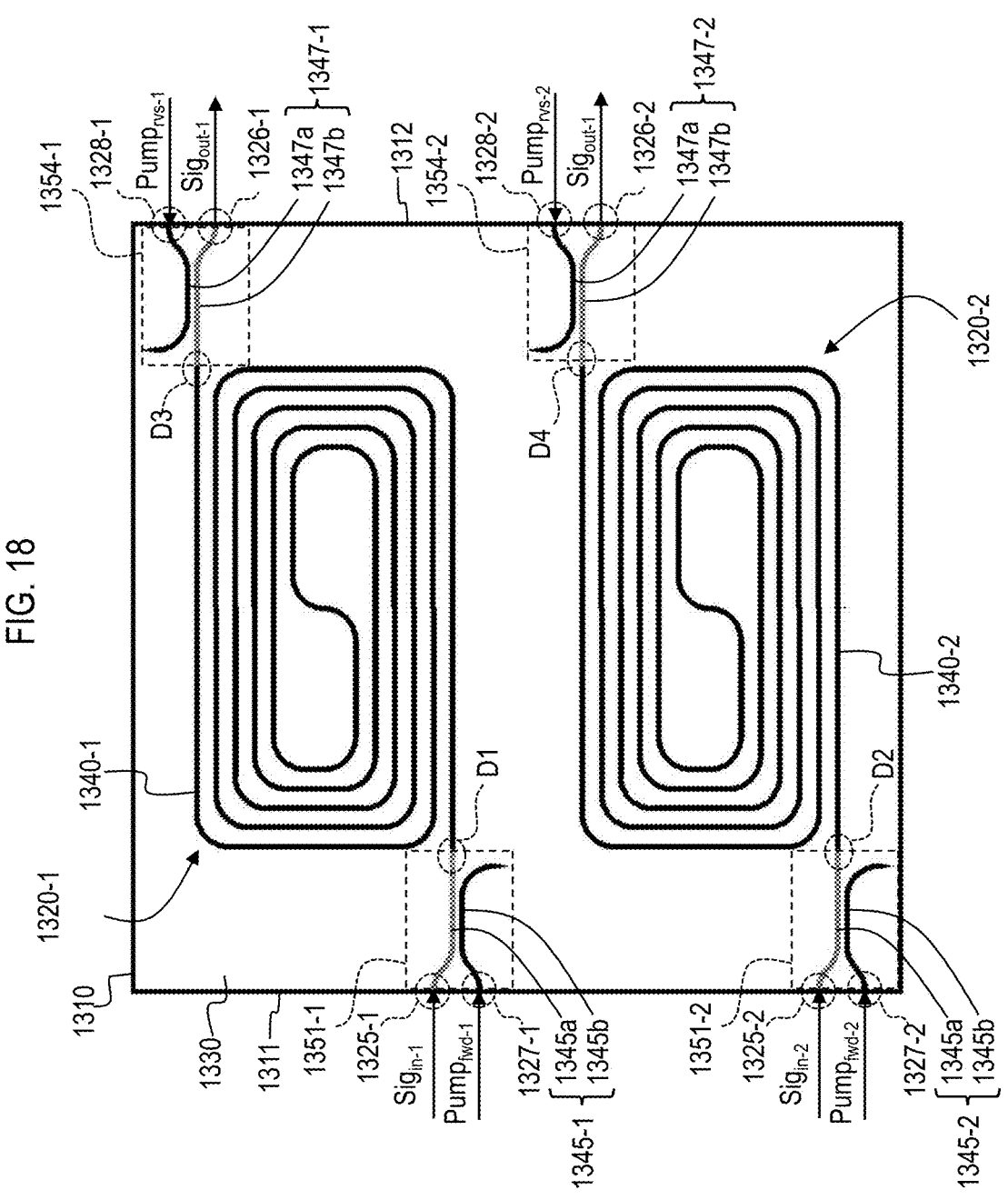
FIG. 18 is a schematic plan view of another example optical device comprising an array of multiple waveguide optical amplifiers with integrated WDM combiners in a same vertical layer.

Turning now to FIG. 18, another optical device 1310 will be described, which is another example configuration of the optical device 710. The optical device 1310 comprises multiple instances of the optical device 910, but combined together on the same substrate (integrated as part of the same chip) and arranged in an array. In other words, the optical device 910 is used as a building block or modular unit, which may be referred to hereinafter as a "tile" and then multiple instances of this tile are arranged in an array on the same substrate to form a photonic integrated circuit capable of amplifying multiple different input light signals (e.g., one per PDWA). In FIG. 18, two such tiles are shown in a 1-dimensional array, but in other examples any number of such tiles may be arrayed together on the same chip in a 1-dimensional array or a 2-dimensional array.

More specifically, each tile or building block of the array in the optical device 1310 comprises a PDWA (e.g., PDWA 1320-1 and 1320-2 in FIG. 19), an input WDM coupler (e.g., WDM couplers 1351-1 and 1351-2), and an output WDM coupler (e.g., WDM couplers 1354-1 and 1354-2). In some examples, the output WDM coupler may be omitted from one, some, or all of the tiles in the array if reverse pumping is not needed.

The operation of the optical device 1310 is similar to that of the optical device 910, except that multiple input signals (e.g., $\text{Sig}_{in-1}$ and $\text{Sig}_{in-2}$) are received and amplified by different PDWAs (e.g., PDWA 1320-1 and 1320-2), and multiple amplified output signals (e.g., $\text{Sig}_{out-1}$ and $\text{Sig}_{out-2}$) are output. In addition, multiple forward and reverse pumping signals may be provided.

In FIG. 18, PDWA 1320-1 comprises WDM couplers 1351-1 and 1354-1, which are all integrated together on the same chip. The PDWA 1320-1 is formed in part by a Pr-doped waveguide core 1340-1, which is one example implementation of the first waveguided core portion 740 described above, and cladding 1330. The WDM couplers 1351-1 and 1354-1, on the other hand, are formed from undoped waveguide core portions 1345-1 and 1347-1, which are formed in the same vertical layer as the doped waveguide core 1340-1. These undoped waveguide core portions 1345-1 and 1347-1 are example implementations of the second waveguided core portion 745 described above in relation to FIG. 12, and are similar in structure and function to the WDM couplers 951 and 947 described above. More specifically, the WDM coupler 1351-1 is formed from two undoped waveguide core portions, namely undoped core portions 1345a and 1345b. The undoped core portion 1345a is coupled to signal input port 1325-1, which is configured to receive the communication signal $\text{Sig}_{in-1}$ which is to be amplified. The undoped core portion 1345b is coupled to pump input port 1327-1, which is configured to receive the forward pump light $\text{Pump}_{fwd}$. Similarly, the WDM coupler 1354-1 is formed from two undoped waveguide core portions 1347-1, namely undoped core portions 1347a and 1347b. The undoped core portion 1347a is coupled to signal output port 1326-1, which is configured to output the amplified communication signal $\text{Sig}_{out-1}$. The undoped core portion 1347b is coupled to reverse pump input port 1328-1, which is configured to receive the reverse pump light $\text{Pump}_{rvs-1}$. WDM coupler 1351-1 is coupled to waveguide core 1340-1 via junction D1. WDM coupler 1354-1 is coupled to waveguide core 1340-1 via junction D3.

In FIG. 18, PDWA 1320-2 comprises WDM couplers 1351-2 and 1354-2, which are all integrated together on the same chip. The PDWA 1320-2 is formed in part by a Pr-doped waveguide core 1340-2, which is one example implementation of the first waveguided core portion 740 described above, and cladding 1330. The WDM couplers 1351-2 and 1354-2, on the other hand, are formed from undoped waveguide core portions 1345-2 and 1347-2, which are formed in the same vertical layer as the doped waveguide core 1340-2. These undoped waveguide core portions 1345-2 and 1347-2 are example implementations of the second waveguided core portion 745 described above in relation to FIG. 12, and are similar in structure and function to the WDM couplers 951 and 947 described above. More specifically, the WDM coupler 1351-2 is formed from two undoped waveguide core portions, namely undoped core portions 1345a and 1345b. The undoped core portion 1345a is coupled to signal input port 1325-2, which is configured to receive the communication signal $Sig_{in-2}$ which is to be amplified. The undoped core portion 1345b is coupled to pump input port 1327-2, which is configured to receive the forward pump light $Pump_{fwd}$. Similarly, the WDM coupler 1354-2 is formed from two undoped waveguide core portions 1347-2, namely undoped core portions 1347a and 1347b. The undoped core portion 1347a is coupled to signal output port 1326-2, which is configured to output the amplified communication signal $Sig_{out-2}$. The undoped core portion 1347b is coupled to reverse pump input port 1328-2, which is configured to receive the reverse pump light $Pump_{rvs-2}$. WDM coupler 1351-2 is coupled to waveguide core 1340-2 via junction D2. WDM coupler 1354-2 is coupled to waveguide core 1340-2 via junction D4.

Figure 19:
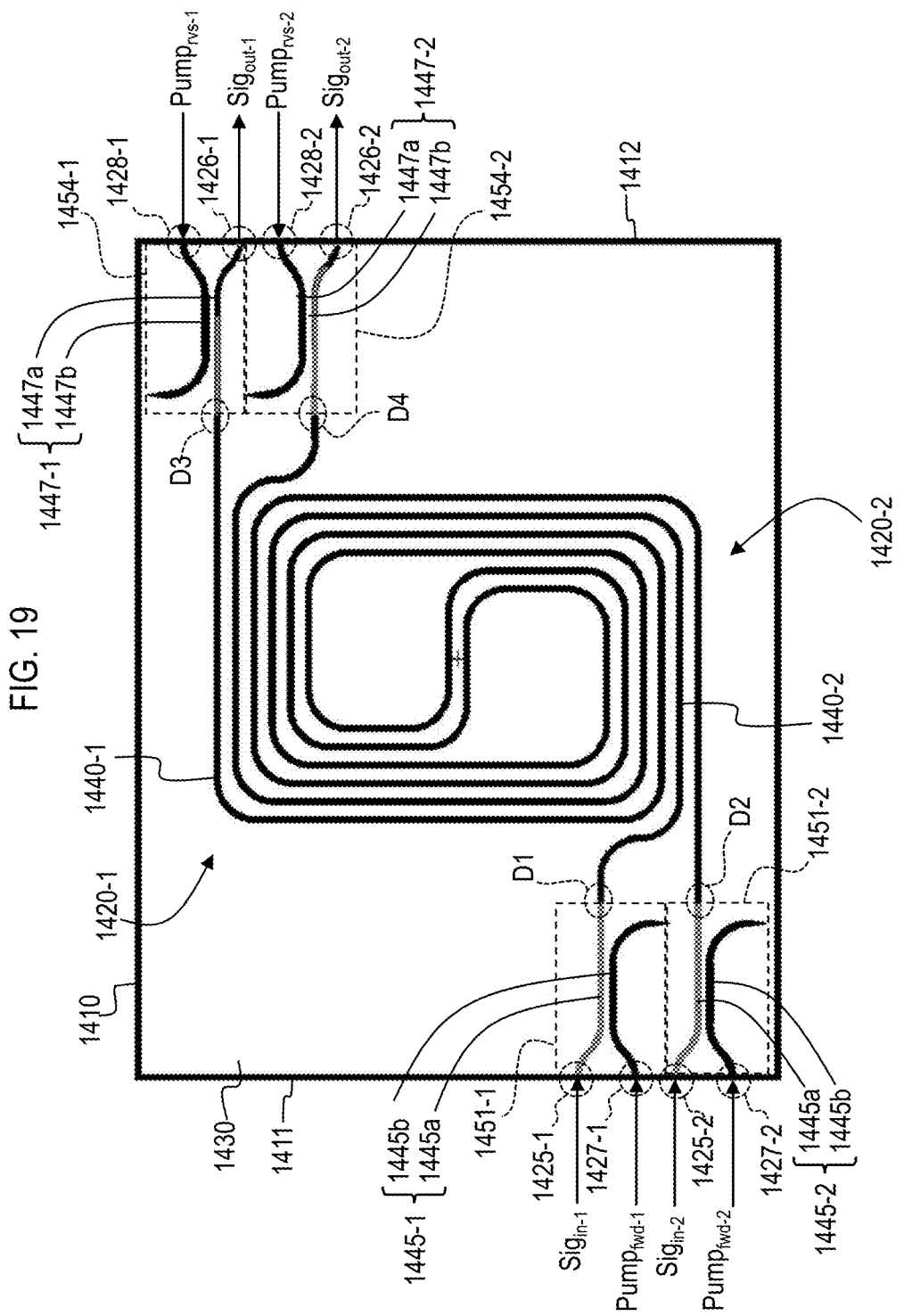
FIG. 19 is a schematic plan view of another example optical device comprising multiple waveguide optical amplifiers with interleaved waveguides and integrated WDM combiners in a same vertical layer.

Turning now to FIG. 19, an optical device 1410 will be described, which is another implementation example of the optical device 710. Like the optical device 1310, the optical device 1410 comprises multiple instances of the optical devices similar to the optical device 910 combined together on the same chip. However, unlike the optical device 1310, in the optical device 1410 the PDWAs 1420 of the multiple optical devices are not arranged in an array, but instead are interleaved with one another. Specifically, the doped waveguide core portions 1440-1 and 1440-2 form parallel interleaved double spirals, with a shared waveguide cladding 1430.

With this configuration, the input WDM couplers 1451-1 and 1451-2 are arranged on a left side of the device 1410 and are coupled to the signal input ports 1425-1 and 1425-2, respectively, and to the forward pumping input ports 1427-1 and 1427-2, respectively. The input WDM couplers 1451-1 and 1451-2 are also coupled to the doped core portions 1440-1 and 1440-2, respectively, via the junction points D1 and D2, respectively. Conversely, output WDM couplers 1454-1 and 1454-2 are arranged on the right side of the optical device 1410, coupled to signal output ports 1426-1 and 1426-2, respectively, and to reverse pumping input ports 1428-1 and 1428-2, respectively. The output WDM couplers 1454-1 and 1454-2 are also coupled to the doped core portions 1440-1 and 1440-2, respectively, via the junction points D3 and D4, respectively. In some examples, the output WDM couplers 1454 may be omitted from if reverse pumping is not needed.

In FIG. 19, PDWA 1420-1 comprises WDM couplers 1451-1 and 1454-1, which are all integrated together on the same chip. The PDWA 1420-1 is formed in part by a Pr-doped waveguide core 1440-1, which is one example implementation of the first waveguided core portion 740 described above, and cladding 1430. The WDM couplers 1451-1 and 1454-1, on the other hand, are formed from undoped waveguide core portions 1445-1 and 1447-1, which are formed in the same vertical layer as the doped waveguide core 1440-1. These undoped waveguide core portions 1445-1 and 1447-1 are example implementations of the second waveguided core portion 745 described above in relation to FIG. 12, and are similar in structure and function to the WDM couplers 951 and 947 described above. More specifically, the WDM coupler 1451-1 is formed from two undoped waveguide core portions, namely undoped core portions 1445a and 1445b. The undoped core portion 1445a is coupled to signal input port 1425-1, which is configured to receive the communication signal $Sig_{in-1}$ which is to be amplified. The undoped core portion 1445b is coupled to pump input port 1427-1, which is configured to receive the forward pump light $Pump_{fwd}$. Similarly, the WDM coupler 1454-1 is formed from two undoped waveguide core portions 1447-1, namely undoped core portions 1447a and 1447b. The undoped core portion 1447a is coupled to signal output port 1426-1, which is configured to output the amplified communication signal $Sig_{out-1}$. The undoped core portion 1447b is coupled to reverse pump input port 1428-1, which is configured to receive the reverse pump light $Pump_{rvs-1}$. WDM coupler 1451-1 is coupled to waveguide core 1440-1 via junction D1. WDM coupler 1454-1 is coupled to waveguide core 1440-1 via junction D3.

In FIG. 19, PDWA 1420-2 comprises WDM couplers 1451-2 and 1454-2, which are all integrated together on the same chip. The PDWA 1420-2 is formed in part by a Pr-doped waveguide core 1440-2, which is one example implementation of the first waveguided core portion 740 described above, and cladding 1430. The WDM couplers 1451-2 and 1454-2, on the other hand, are formed from undoped waveguide core portions 1445-2 and 1447-2, which are formed in the same vertical layer as the doped waveguide core 1440-2. These undoped waveguide core portions 1445-2 and 1447-2 are example implementations of the second waveguided core portion 745 described above in relation to FIG. 12, and are similar in structure and function to the WDM couplers 951 and 947 described above. More specifically, the WDM coupler 1451-2 is formed from two undoped waveguide core portions, namely undoped core portions 1445a and 1445b. The undoped core portion 1445a is coupled to signal input port 1425-2, which is configured to receive the communication signal $Sig_{in-2}$ which is to be amplified. The undoped core portion 1445b is coupled to pump input port 1427-2, which is configured to receive the forward pump light $Pump_{fwd}$. Similarly, the WDM coupler 1454-2 is formed from two undoped waveguide core portions 1447-2, namely undoped core portions 1447a and 1447b. The undoped core portion 1447a is coupled to signal output port 1426-2, which is configured to output the amplified communication signal $Sig_{out-2}$. The undoped core portion 1447b is coupled to reverse pump input port 1428-2, which is configured to receive the reverse pump light $Pump_{rvs-2}$. WDM coupler 1451-2 is coupled to waveguide core 1440-2 via junction D2. WDM coupler 1454-2 is coupled to waveguide core 1440-2 via junction D4.

Figure 20:
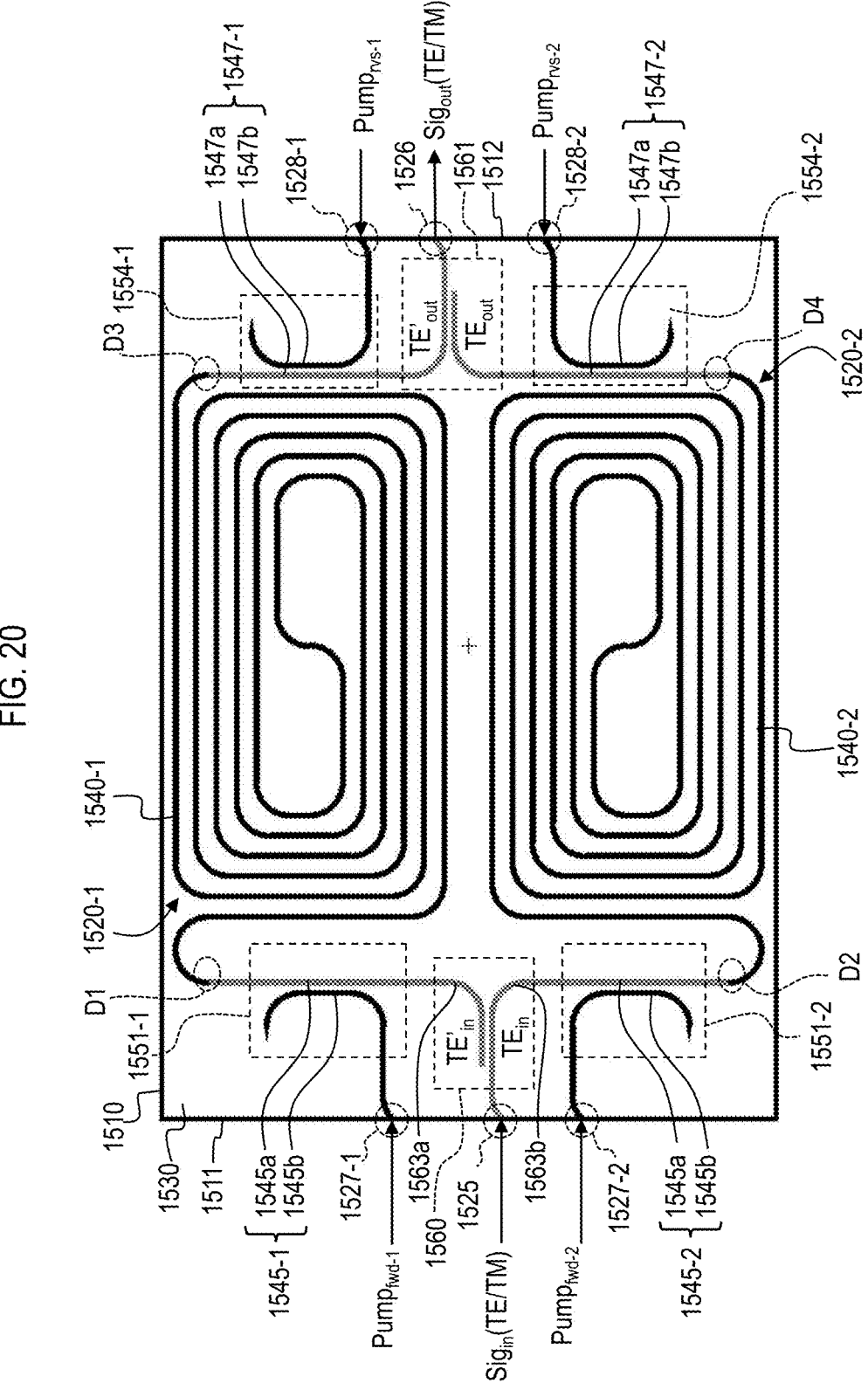
FIG. 20 is a schematic plan view of another example optical device comprising a waveguide optical amplifier with integrated polarization splitter and combiner and integrated WDM combiners in a same vertical layer.

Turning now to FIG. 20, an optical device 1510 will be described, which is another implementation example of the optical device 710. Like the optical device 910, the optical device 1510 comprises both doped and undoped waveguide core portions which are disposed in the same vertical layer of the same chip. However, unlike the optical device 910, in the optical device 1510 there are two doped waveguide core portions 1540-1 and 1540-2, which form two different PWDAs 1520-1 and 1520-2 (with shared waveguide cladding 1530). Moreover, in the optical device 1510, in addition to forming WDM couplers 1545-1, 1545-2, 1547-1 and 1547-2, the undoped waveguide portions also form integrated polarization splitter rotator 1560 and rotator combiner 1561.

The integrated polarization splitter 1560 may be similar in construction and operation to the integrated polarization splitter 260 described above, except that the integrated polarization splitter 1560 is formed from undoped waveguide core portions 1563a and 1563b rather than doped waveguide cores. Furthermore, these two undoped waveguide core portions 1563a and 1563b are coupled respectively to two input WDM couplers 1551-1 and 1551-2. These input WDM couplers 1551-1 and 1551-2 are integrated into the same chip as well, and are similar to the input WDM coupler 951 of the device 910. The input WDM couplers 1551-1 and 1551-2 are coupled to the doped core portions 1540-1 and 1540-2, respectively, via junction points D1 and D2, respectively.

Similarly, the integrated polarization combiner 1561 may be similar in construction and operation to the integrated polarization splitter 261 described above, except that the integrated polarization combiner 1561 is formed from undoped waveguide core portions (not labeled) rather than doped waveguide cores. Furthermore, these two undoped waveguide core portions are coupled respectively to two output WDM couplers 1554-1 and 1554-2. These output WDM couplers 1554-1 and 1554-2 are integrated into the same chip, and are similar to the output WDM coupler 954 of the device 910. The output WDM couplers 1554-1 and 1554-2 are coupled to the doped core portions 1540-1 and 1540-2, respectively, via junction points D3 and D4, respectively.

The optical device 1510 may operate as follows. Signal light having TM and TE modes $Sig_{in}(TE/TM)$ is input via port 1525 into the polarization splitter 1560 and is split into two TE mode signals, $TE_{in}$ which is directed along undoped core portion 1563b and $TE'_{in}$ which is directed along core portion 1563a. The signal $TE_{in}$ is then input into the undoped core portion 1545a of the WDM coupler 1551-2, whereas the signal $TE'_{in}$ is input into the undoped core portion 1545a of the WDM coupler 1551-1. Concurrently, forward pump light $Pump_{fwd-1}$ and $Pump_{fwd-2}$ is being input via ports 1527-1 and 1527-2, respectively, into the undoped core portions 1545b of the WDM couplers 1551-1 and 1551-2. The forward pump light $Pump_{fwd-1}$ in the core portion 1545b of the WDM coupler 1551-1 couples over into the core portion 1545a of the WDM coupler 1551-1, thus joining with the $TE'_{in}$ signal, and this combined signal is conveyed via junction D1 into the doped waveguide portion 1540-1. Similarly, forward pump light $Pump_{fwd-2}$ in the core portion 1545b of the WDM coupler 1551-2 couples over into the core portion 1545a of the WDM coupler 1551-2, thus joining with the $TE_{in}$ signal, and this combined signal is conveyed via junction D2 into the doped waveguide portion 1540-2. Reverse pumping signals $Pump_{rvs-1}$ and $Pump_{rvs-2}$ are also concurrently injected into the PDWA 1520-1 and 1520-2 via the ports 1528-1 and 1528-2 and the WDM couplers 1554-1 and 1554-2. The signals $TE'_{in}$ and $TE_{in}$ are amplified as they pass through the doped core portions 1540-1 and 1540-2, and the amplified output signals $TE'_{out}$ and $TE_{out}$ are then ultimately combined back into the signal $Sig_{out}(TE/TM)$ by the polarization rotator combiner 1561 and output from the device 1510 via port 1526.

Figure 21:
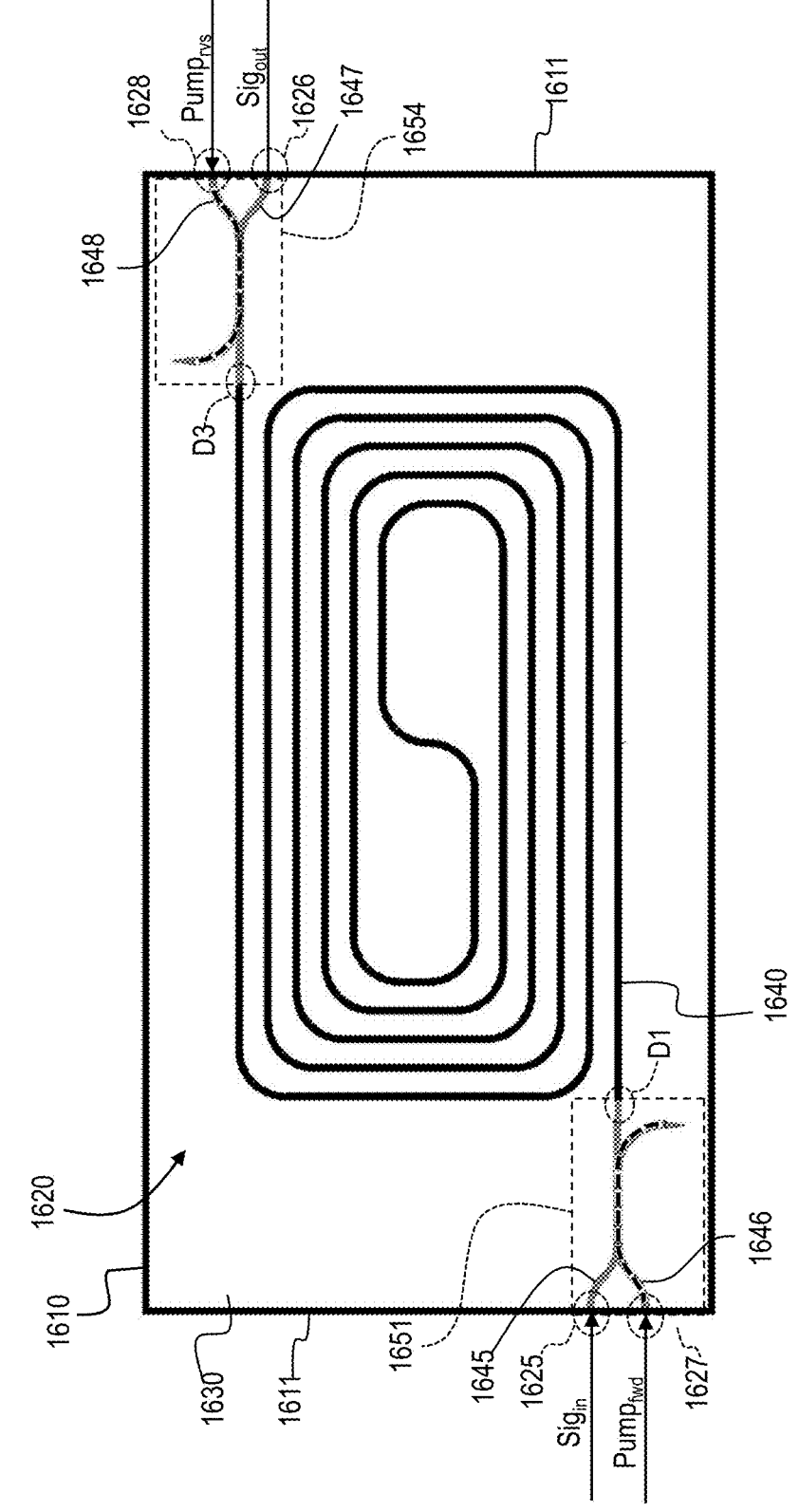
FIG. 21 is a schematic plan view of another example optical device comprising a waveguide optical amplifier with integrated WDM combiners in different vertical layers.

Turning now to FIG. 21, an optical device 1610 will be described, which is an implementation example of the optical device 810. The optical device 1610 is similar to the optical device 910 in that the optical device 1610 comprises a PDWA 1620 together with two integrated WDM couplers 1651 and 1654, which are all integrated together on the same chip and which comprises both doped and undoped waveguide core portions. Specifically, the PDWA 1620 is formed by doped waveguide core 1640 together with waveguide cladding 1630, whereas the WDM couplers 1651 and 1654 are formed by undoped waveguide core portions 1645, 1646, 1647, and 1648 together with waveguide cladding 1630. However, the optical device 1610 differs from the optical device 910 in that the undoped waveguide core portions include some undoped waveguide core portions 1646 and

1648 that are located in a different vertical layer than the doped waveguide core portion 1640. These undoped waveguide core portions 1646 and 1648 are example implementations of the second waveguide core portion 846 described above in relation to FIG. 13.

More specifically, the WDM coupler 1651 is formed from an undoped waveguide core portions 1645 formed in the same vertical layer as the doped waveguide core portion 1640 and an undoped waveguide core portion 1646 which is positioned in a different vertical layer than both the doped waveguide core portion 1640 and the undoped waveguide portion 1645. (The core portion 1646 is indicated by dashed lines in FIG. 21.) The undoped core portion 1645 is coupled to signal input port 1625 at edge 1611, which is configured to receive the communication signal $Sig_{in}$ which is to be amplified. The undoped core portion 1646 is coupled to pump input port 1627, which is configured to receive the forward pump light $Pump_{fwd}$. As shown in FIG. 21, there is a region in which the undoped core portions 1645 and 1646 overlap one another and extend parallel to one another in close proximity, thus allowing the pump light $Pump_{fwd}$ to couple over from the undoped core portion 1646 into the undoped core portion 1645.

Similarly, the WDM coupler 1654 is formed from an unopened waveguide portion 1647 in the same layer as the doped core portion 1640 and another undoped waveguide portion 1648 in a different layer than these. There is a region in which these undoped core portions 1648 and 1647 overlap one another vertically and extend parallel to one another and in close proximity, thus allowing the reverse pump signal $Pump_{rvs}$ to couple over from the undoped core portion 1648 to the core portion 1647. The portion 1648 is coupled to reverse pump port 1628 on edge 1612 to receive reverse pump light $Pump_{rvs}$, while the portion 1654 is coupled to outlet portion 1647 on edge 1612 to output amplified signal light $Sig_{out}$.

Figure 22:
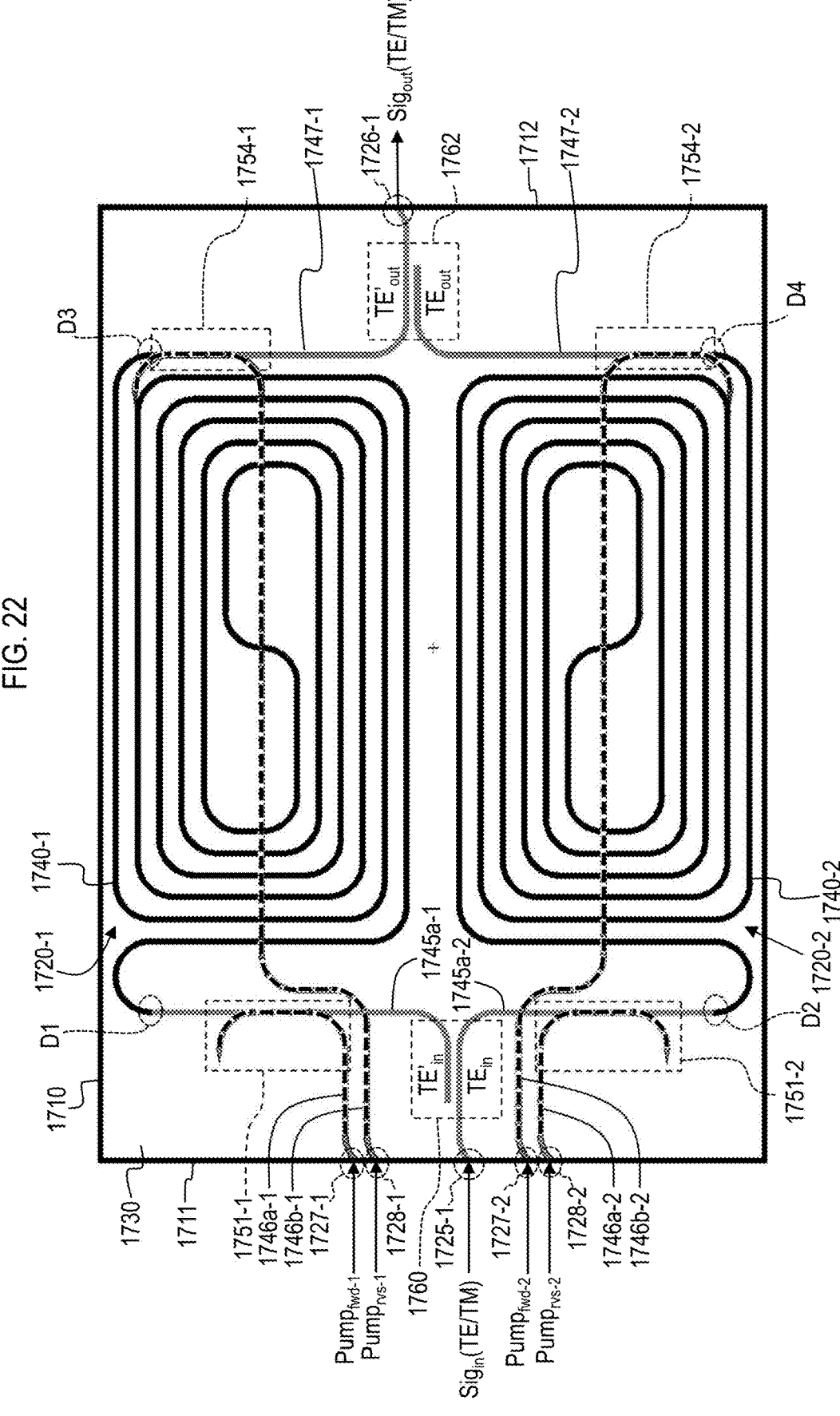
FIG. 22 is a schematic plan view of another example optical device comprising a waveguide optical amplifier with integrated polarization splitter and combiner and integrated WDM combiners in different vertical layers.

Turning now to FIG. 22, another optical device 1710 will be described, which is another implementation example of the optical device 810. The optical device 1710 is similar to the optical device 1510 in that the optical device 1610 comprises multiple PDWAs, WDM couplers, and polarization splitters/combiners all integrated together on the same chip, wherein the PDWAs are formed from Pr-doped waveguide core portions and the other components are formed from undoped waveguide core portions. The optical device 1710 differs from the optical device 1510 in that in the optical device 1710 some of the undoped waveguide core portions are formed in different vertical layers than the doped waveguide core portions.

Specifically, the PDWAs 1720-1 and 1720-2 are formed from Pr-doped waveguide portions 1740-1 and 1740-2 together with waveguide cladding 1730. Moreover, undoped core portions 1746a-1, 1746a-2, 1746b-1, and 1746b-2, which are indicated by dashed lines in FIG. 22, are formed in a different vertical layer than the doped core portions 1740-1 and 1740-2. In addition, undoped core portions 1745a-1, 1745a-2, 1747-1, and 1747-2 are formed in a same vertical layer as the doped core portions 1740-1 and 1740-2.

The first input WDM coupler 1751-1 is formed from part of the undoped core portion 1746a-1 and part of the undoped core portion 1745a-1; specifically, the WDM coupler 1751-1 is formed in a region where the undoped core portions 1746a-1 and 1745a-1 extend parallel to one another, vertically overlap, and are relatively close to one another, such that the pump light $Pump_{fwd-1}$ received from port 1727-1 can couple from the undoped core portion 1746a-1 into the undoped core portion 1745a-1. The second input WDM coupler 1751-2 is formed in a similar fashion from part of the undoped core portion 1746*a*-2 and part of the undoped core portion 1745*a*-2, such that the pump light Pump$_{fwd-2}$ received from input port 1728-2 can couple from the undoped core portion 1746*a*-2 into the undoped core portion 1745*a*-2.

In a similar fashion, the first output WDM coupler 1754-1 is formed from part of the undoped core portion 1746*b*-1 and part of the undoped core portion 1747-1; specifically, the WDM coupler 1754-1 is formed in a region where the undoped core portions 1746*b*-1 and 1747-1 extend parallel to one another, vertically overlap, and are relatively close to one another, such that the reverse pump light Pump$_{rvs-1}$ received from port 1728-1 can couple from the undoped core portion 1746*b*-1 into the undoped core portion 1747-1. The second output WDM coupler 1754-2 is formed in a similar fashion from part of the undoped core portion 1746*b*-2 and part of the undoped core portion 1747-2, such that the reverse pump light Pump$_{rvs-2}$ received from input port 1728-2 can couple from the undoped core portion 1746*b*-2 into the undoped core portion 1747-2.

The polarization splitter 1760 and combiner 1762 may be formed and may operate in the same manner as the polarization splitter 1560 and combiner 1562, respectively.

As shown in FIG. 22, pump ports 1727-1, 1727-2, 1728-1, and 1728-2, are all located along the same edge 1711 of the optical device 1710, whereas the output WDM couplers 1754-1 and 1754-2 are located near the opposite edge 1712. Therefore, the undoped core portions 1746*b*-1 and 1746*b*-2 need to extend across the device 1710 to reach the output WDM couplers 1754-1 and 1754-2. If the undoped core portions 1746*b*-1 and 1746*b*-2 were in the same vertical layer as the doped core portions 1740, such routing of the undoped core portions 1746*b*-1 and 1746*b*-2 across the device 1710 may be more challenging, may require a larger area for the device 1710, and/or may require a different positional arrangement for the pump ports 1727-1, 1727-2, 1728-1, and 1728-2. However, because the undoped core portions 1746*b*-1 and 1746*b*-2 are in a different vertical layer then the doped core portions 1740, it is relatively easy to route the undoped core portions 1746*b*-1 and 1746*b*-2 across the device 1710 while maintaining a relatively compact footprint and the desired pump port placements.

As already noted above, in some examples multiple "tiles," each comprising at least a waveguide optical amplifier (and in some cases additional components), may be arrayed together on the same substrate (in one or two dimensional arrays). FIG. 18, which was discussed above, illustrates one such example in which multiple tiles which correspond in layout to the optical device 910 are arrayed on the same substrate. However, in other examples (not illustrated) tiles which correspond in layout to other ones of the optical devices disclosed herein may be arrayed in a similar manner on the same substrate. For example, multiple tiles of any of the optical devices 10, 210, 310, 410, 510, 610, 710, 810, 910, 1010, 1110, 1210, 1410, 1510, 1610, or 1710 described above can be arrayed on the same substrate in a fashion similar to that shown in FIG. 18. Moreover, although only two tiles are shown in the array of FIG. 18 to simplify the illustration, any number of tiles may be included in the aforementioned arrays. Further, although the tiles are arrayed vertically in FIG. 18, they may instead be arrayed extend horizontally or in a two-dimensional array (e.g., grid) with rows and columns of tiles. Furthermore, although in FIG. 18 the same type of tile is used in the array, this need not necessarily be the case and different tiles corresponding to different ones of the optical devices disclosed herein may be mixed and matched as desired. For example, a tile corresponding to the optical device 910 and a tile corresponding to the optical device 1510 (or any other one of the disclosed optical devices) may be arrayed together on the same substrate.

Figure 23:
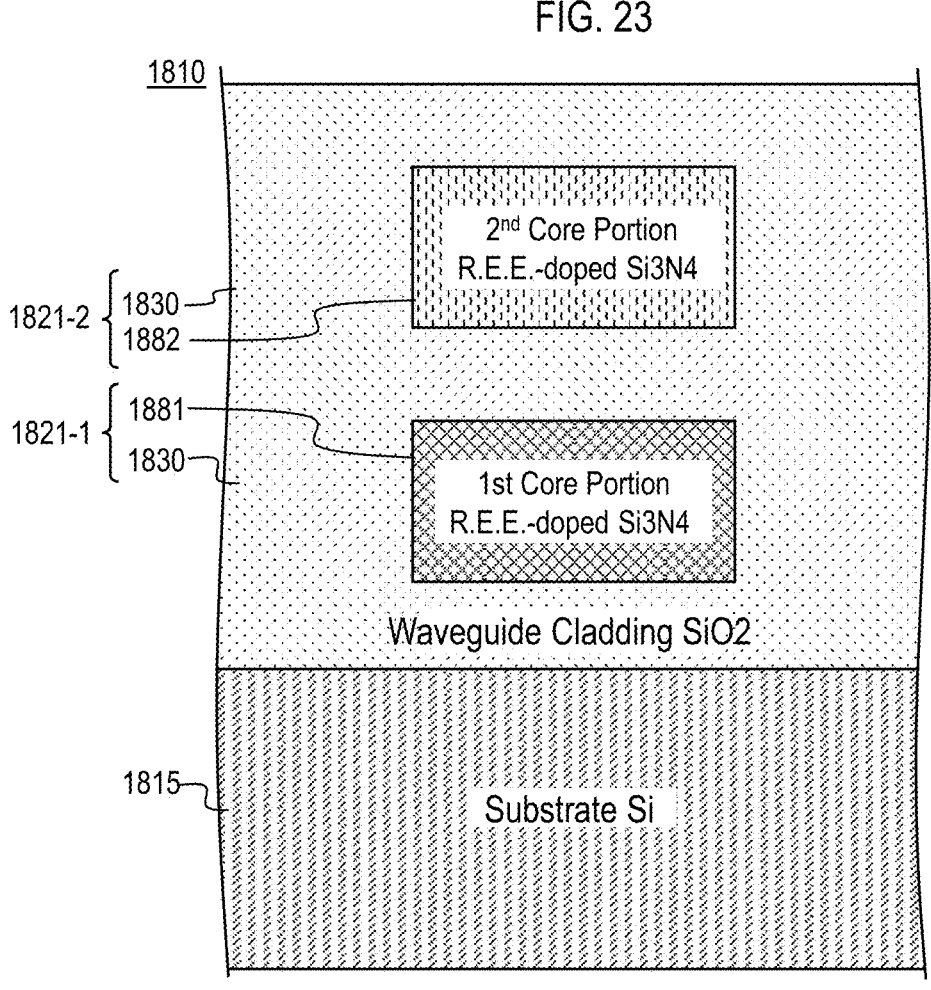
FIG. 23 is a schematic cross-section of another example optical device comprising a waveguide optical amplifier comprising two doped core portions in different vertical layers.

Turning now to FIG. 23, an example optical device 1810 will be described. The optical device 1810 comprises two doped waveguide amplifier sections 1821-1 and 1821-2 which are disposed on the same substrate 1815 but which are in different vertical layers than on another. In some examples, the doped waveguide amplifier sections 1821-1 and 1821-2 form separate respective doped waveguide amplifiers, which happen to be integrated onto the same chip but which amplify respectively different signals. In other examples, the doped waveguide amplifier sections 1821-1 and 1821-2 form a single doped waveguide amplifier (e.g., they are two parts or sections of the same amplifier).

Each doped waveguide amplifier section 1821-1 and 1821-2 is formed from a doped waveguide core and cladding which at least partially surrounds the core. In particular, the doped waveguide amplifier section 1821-1 comprises the doped waveguide core 1881, while the doped waveguide amplifier section 1821-2 comprises the doped waveguide core 1882. In the illustrated example, both doped waveguide amplifier sections 1821-1 and 1821-2 have the same waveguide cladding 1830, but in other examples different cladding materials may be used for the respective doped waveguide amplifier sections 1821-1 and 1821-2.

In an example, the substrate 1815 comprises Silicon (Si) or glass and the cladding 1830 and the cores 1881 and 1882 are formed from Silicon-based materials. In an example, the cladding 1830 comprises Silicon Dioxide (SiO2) and each of the cores 1881 and 1882 comprises Silicon Nitride (Si3N4) which has been doped with a rare earth element (which is abbreviated as "R.E.E." in FIG. 23). Examples of suitable rare earth elements for doping the cores 1881 or 1882 include Praseodymium (Pr), Erbium (Er), Ytterbium (Yb), etc. In some examples, the same rare earth element is used to dope both of the cores 1881 and 1882, while in other examples different rare earth elements are used to dope the cores 1881 and 1882, respectively. Examples will be described in greater detail below with reference to FIGS. 24-29.

The particular dimensions of the portions 1881 and 1882 and the vertical distance between the portions 1881 and 1882 can vary from one device to the next depending on materials chosen and design constraints. In some examples, the distance between core portions 1881 and 1882 is about 0.5 µm to 1 µm in regions where coupling between the cores is desired (such as in cases in which a vertical coupler is formed), whereas the distance between core portions 1881 and 1882 may be greater than 1 µm in regions where coupling between the cores is not desired.

Figure 24:
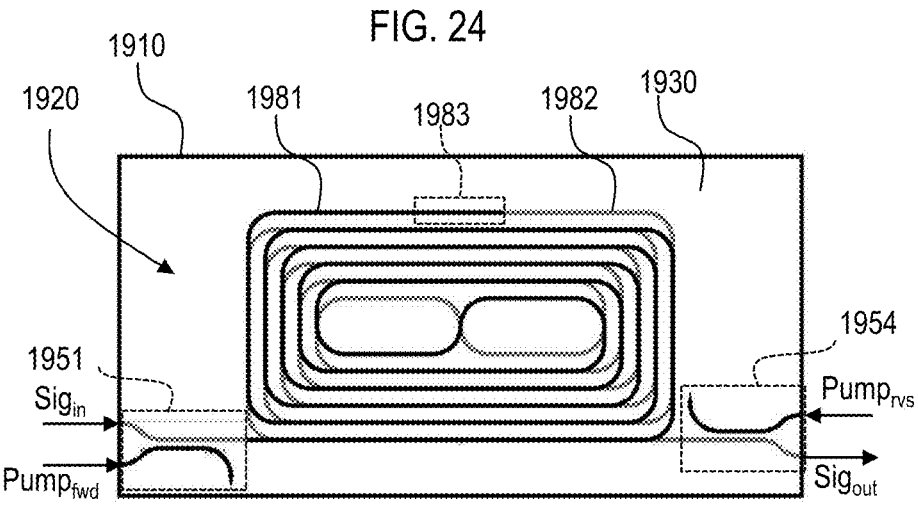
FIG. 24 is a schematic plan view of an example optical device comprising a waveguide optical amplifier comprising two doped waveguide core portions formed in different vertical layers.
Figure 25:
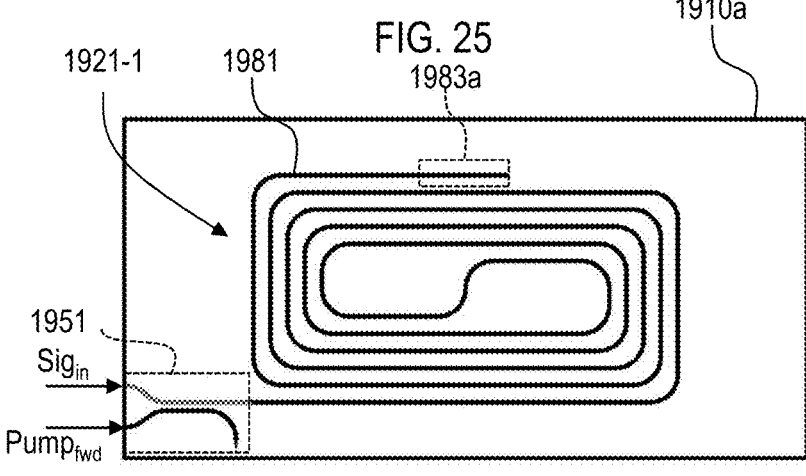
FIG. 25 is a schematic plan view of one layer of the example optical device of FIG. 24.
Figure 26:
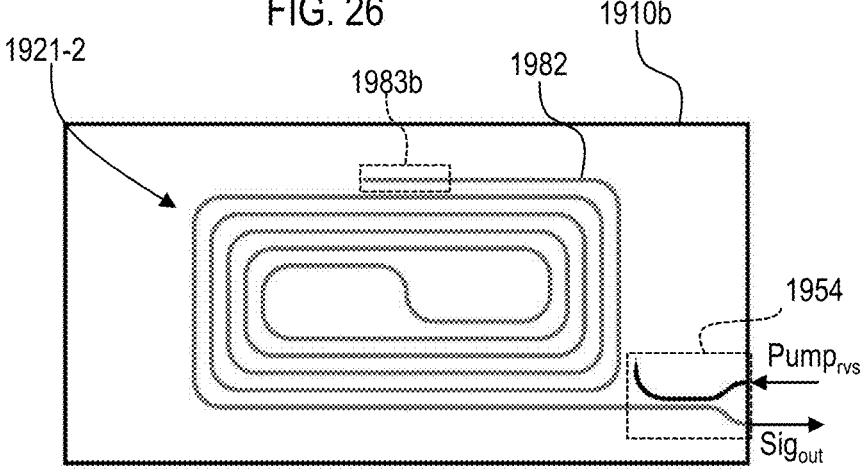
FIG. 26 is a schematic plan view of another layer of the example optical device of FIG. 24.

FIGS. 24-26 illustrate an optical device 1910, which is an example implementation of the optical device 1810. The optical device 1910 comprises multiple layers vertically stacked atop a substrate (not illustrated), including at least a first layer 1910*a* and a second layer 1910*b* vertically stacked on the first layer 1910*a*. FIG. 24 illustrates a plan view of the optical device 1910 with all layers, whereas FIGS. 25 and 26 illustrate plan views of the first and second layers 1910*a* and 1910*b*, respectively, in isolation.

In the example optical device 1910, there are two doped waveguide amplifier sections 1921-1 and 1921-2 formed in the layers 1910*a* and 1910*b*, respectively. Although formed in different layers, the doped waveguide amplifier sections 1921-1 and 1921-2 are two parts of the same waveguide amplifier 1920. The doped waveguide amplifier section 1921-1 comprises a first doped waveguide core portion 1981 (together with cladding 1930), which is an example of the waveguide core portion 1981. The doped waveguide amplifier section 1921-2 comprises a second doped waveguide core portion 1982 (together with cladding 1930), which is an example of the waveguide core portion 1982. The waveguide core portions 1981 and 1982 are optically coupled by an adiabatic vertical coupler 1983, which comprises a first portion 1983a of the waveguide core 1981 and a second portion 1983b of the waveguide core 1982 which are arranged to be parallel to one another, vertically overlapping, and relatively close to one another (small vertical separation distance) such that light from the waveguide core portion 1981 couples over to the waveguide core portion 1982 while passing through the adiabatic vertical coupler 1983. The particular dimensions of these portions and the distance between the portions can vary from one device to the next depending on materials chosen and design constraints. In some examples, the distance between core portions 1981 and 1982 in the adiabatic vertical coupler 1983 is about 0.5 µm to 1 µm. In some examples, other portions of the amplifier sections 1981 and 1982 outside of the coupler 1983 may be separated by a greater separation distance to prevent unintended coupling therebetween. In some examples, the vertical separation distance outside of the coupler 1983 may be greater than 1 µm, and in some examples, between 1 µm and 10 µm.

By vertically stacking the waveguide amplifier sections 1981 and 1982, the overall length of the waveguide amplifier 1920 can be greatly increased without increasing the footprint of the waveguide amplifier (footprint referring to the 2D area occupied in a plan view). While this does make the chip thicker in the vertical direction, increasing the thickness of the chip may sometimes be cheaper than increasing the footprint thereof. Although only two stacked amplifier sections are illustrated, any number of amplifier sections vertically stacked in any number of layers may be used to form a given amplifier.

In the illustrated example, the optical device 1910 further comprises integrated input and output WDM couplers 1951 and 1954, which are constructed in a similar fashion to the other input and output WDM couplers described above. However, in this example, the input and output WDM couplers 1951 and 1954 may be formed in different vertical layers than one another. For example, the input WDM coupler 1951 may be formed in the first layer 1910a while the output WDM coupler 1954 is formed in the second layer 1910b. In other example, one or both of the WDM couplers may be omitted. Although not illustrated, other optical components may also be integrated into the optical device 1910, such as polarization splitters combiners similar to those already described above.

In some examples, both the core portions 1981 and 1982 are doped with Pr, and thus the amplifier 1920 is a PDWA which amplifies O-band light. In these examples, $\text{Sig}_{in}$ comprises O-band light and $\text{Pump}_{fwd}$ and $\text{Pump}_{rvs}$ comprise approximately 980 nm wavelength light.

In other examples, both the core portions 1981 and 1982 are doped with Er, and thus the amplifier 1920 is an EDWA which amplifies C-band light. In these examples, $\text{Sig}_{in}$ comprises C-band light and $\text{Pump}_{fwd}$ and $\text{Pump}_{rvs}$ comprise approximately 980 nm or 1480 nm wavelength light. Such an EDWA 1920 differs from existing EDWAs at least in that it comprises two sections formed in different vertical layers. Moreover, examples in which an EDWA 1920 has integrated WDM couplers or other integrated components formed on the same chip may also differ from existing EDWAs at least by virtue of having the other integrated optical components. The EDWA 1920 may also differ from existing EDWAs in the shape of its waveguide core portions 1981 and 1982. Additionally, the EDWA 1920 may incorporate undoped regions where passive optical components may be formed, such as the integrated WDM coupler, similar to any of the example ODWA described above.

In other examples, both core portions 1981 and 1982 are doped with some other rare-earth element, and/or may amplify light in a different band than the O- or C-bands.

Figures 27, 28, 29:
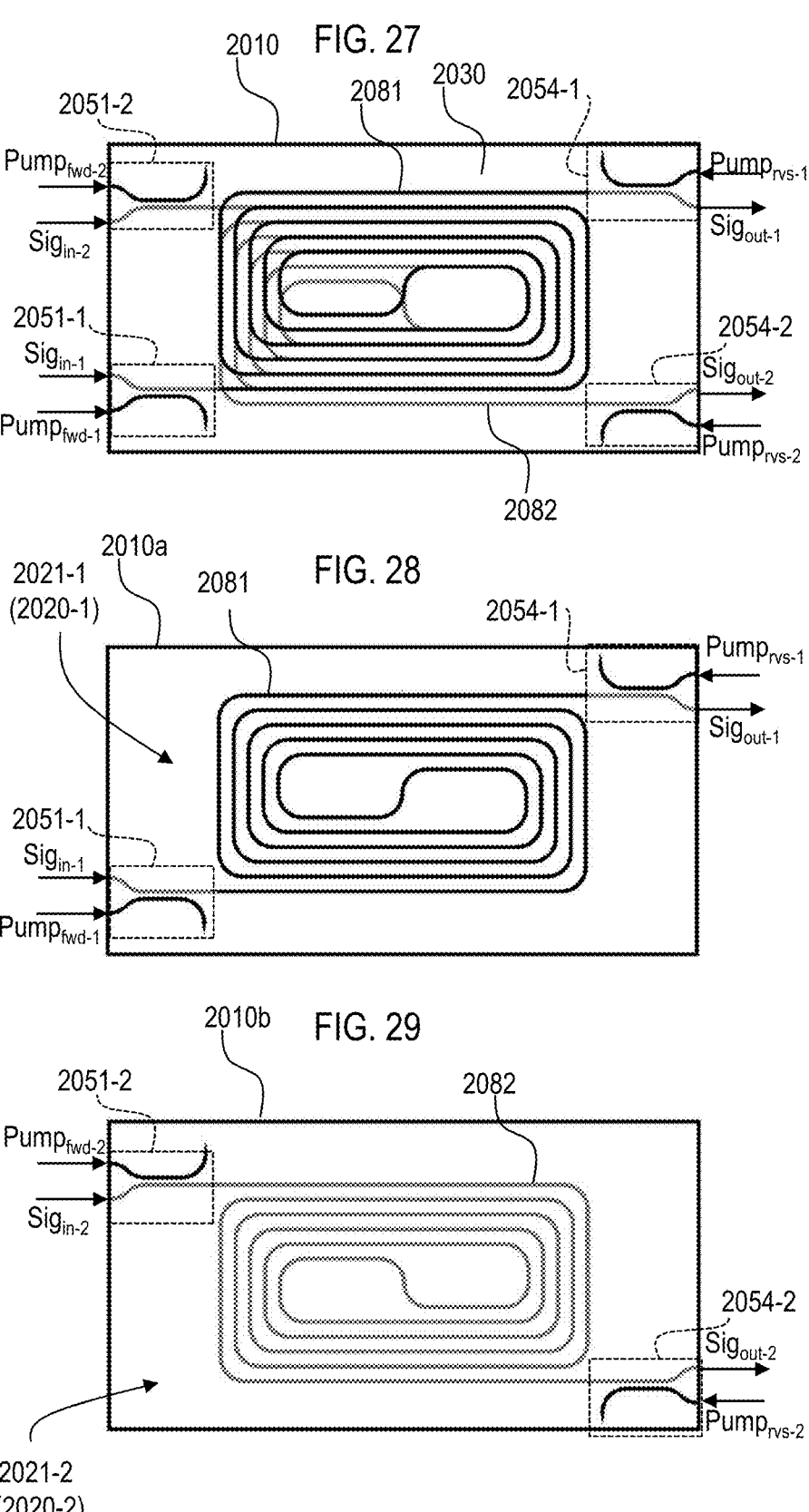
FIG. 27 is a schematic plan view of an example optical device comprising two waveguide optical amplifiers formed in different vertical layers.
FIG. 28 is a schematic plan view of one layer of the example optical device of FIG. 27.
FIG. 29 is a schematic plan view of another layer of the example optical device of FIG. 27.

FIGS. 27-29 illustrate an optical device 2010, which is an example implementation of the optical device 1810. The optical device 2010 comprises multiple layers vertically stacked atop a substrate (not illustrated), including at least a first layer 2010a and a second layer 2010b vertically stacked on the first layer 2010a. FIG. 27 illustrates a plan view of the optical device 2010 with all layers, whereas FIGS. 28 and 29 illustrate plan views of the first and second layers 2010a and 2010b, respectively, in isolation.

Like the optical device 1910, in the example optical device 2010, there are two doped waveguide amplifier sections 2021-1 and 2021-2 formed in the layers 2010a and 2010b, respectively. Unlike the optical device 1910, in the optical device the doped waveguide amplifier sections 2021-1 and 2021-2 form two separate waveguide amplifiers 2020-1 and 2020-2, respectively. The doped waveguide amplifier section 2021-1 comprises a first doped waveguide core portion 2081 (together with cladding 2030), which is an example of the waveguide core portion 2081. The doped waveguide amplifier section 2021-2 comprises a second doped waveguide core portion 2082 (together with cladding 2030), which is an example of the waveguide core portion 2082. By vertically stacking the waveguide amplifiers 1920-1 and 1920-2, multiple amplifiers can be disposed within the same footprint as a single amplifier.

In the illustrated example, the optical device 2010 further comprises integrated input and output WDM couplers 2051-1, 2051-2, 2054-1, and 2054-2, which are constructed in a similar fashion to the other input and output WDM couplers described above. The WDM couplers 2051-1 and 2054-1 are provided in the first layer 2010a and are coupled to opposite sides of the waveguide core portions 2081, whereas WDM couplers 2051-2 and 2054-2 are provided in the second layer 2010b and are coupled to opposite sides of the waveguide core portions 2082. In other examples, some or all of the WDM couplers may be omitted. Although not illustrated, other optical components may also be integrated into the optical device 2010, such as polarization splitters combiners similar to those already described above.

In some examples, both the core portions 2081 and 2082 are doped with the same rare earth elements as one another. In one example, both the core portions 2081 and 2082 are doped with Pr, and thus the amplifiers 2020 are both PDWAs which amplify separate O-band light signals. In such examples, $\text{Sig}_{in-1}$ and $\text{Sign}_{in-2}$ comprise O-band signals and $\text{Pump}_{fwd-1}$, $\text{Pump}_{fwd-2}$, $\text{Pump}_{rvs-1}$, and $\text{Pump}_{rvs-2}$, may comprise pump light having approximately 980 nm wavelength. In other examples, both the core portions 2081 and 2082 are doped with Er, and thus the amplifier 2010 is an EDWA which amplifies C-band light. In such examples, $\text{Sig}_{in-1}$ and $\text{Sign}_{in-2}$ comprise C-band signals and $\text{Pump}_{fwd-1}$, $\text{Pump}_{fwd-2}$, $\text{Pump}_{rvs-1}$, and $\text{Pump}_{rvs-2}$, may comprise pump light having approximately 980 nm or 1480 nm wavelength. Such an EDWA 2010 differs from existing EDWAs at least in that it comprises two sections formed in different vertical layers. Moreover, examples in which an EDWA 2010 has integrated WDM couplers or other integrated components formed on the same chip may also differ from existing EDWAs at least by virtue of having the other integrated optical components. The EDWA 1820 may also differ from existing EDWAs in the shape of its waveguide core portions 2081 and 2082. In other examples, both core portions 2081 and 2082 are doped with some other rare-earth element, and/or may amplify light in a different band than the O- or C-bands.

In some examples, the core portions 2081 and 2082 are doped with the different rare earth elements than one another. In one example, core portion 2081 is doped with Pr, and thus the amplifiers 2020-1 is a PDWA, whereas core portion 2082 is doped with Er, and thus the amplifier 2020-2 is an EDWA. In such examples, $Sig_{in\text{-}1}$ comprises O-band signals, $Sig_{in\text{-}2}$ and comprises C-band signals, $Pump_{fwd\text{-}1}$ and $Pump_{rvs\text{-}1}$ comprise wavelengths of approximately 980 nm, and $Pump_{fwd\text{-}2}$ and $Pump_{rvs\text{-}2}$ comprise wavelengths of approximately 980 nm or 1480 nm. In other examples, core portions 2081 and 2082 are doped with other rare earth elements.

The particular dimensions of these portions and the distance between the portions can vary from one device to the next depending on materials chosen and design constraints. In some examples, the vertical distance between core portions 2081 and 2082 greater than 1 μm, and in some examples, between 1 μm and 10 μm.

Although only two stacked amplifiers are shown in FIGS. 27-29, any number of amplifiers can be vertically stacked in any number of layers in this manner. Moreover, although not illustrated, multi-layer amplifiers that comprise waveguides formed in multiple vertical layers (such as the amplifier 1920) can also be vertically stacked atop one another on the same chip in a similar fashion. Furthermore, although in FIGS. 27-29 each the layers 2010*a* and 2010*b* comprises a waveguide amplifier 2020-1 or 2020-2 and other optical components that are arranged in a configuration that resembles that of the optical device 910, this is merely one example, and in other examples the waveguide amplifiers and/or other optical component in that layer may be arranged according to a configuration that resembles any one of the configurations of any of the optical devices described above.

Figure 30:
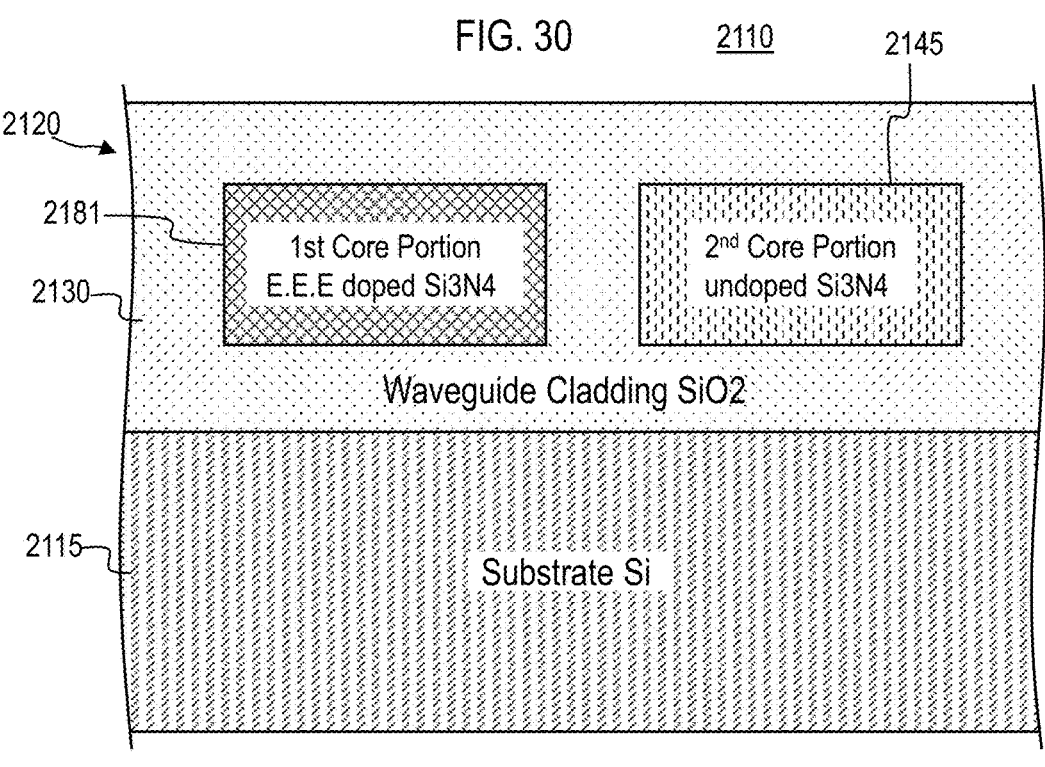
FIG. 30 is a schematic cross-section of another example optical device comprising a waveguide optical amplifier comprising a doped core portion and an undoped core portion in the same vertical layer.

Turning now to FIG. 30, an example optical device 2110 will be described. The optical device 2110 comprises a doped waveguide core portion 2181 and an undoped waveguide core portion 2145, which are disposed on the same substrate 2115 in a same vertical layer. The optical device 2110 is similar to the optical device 710 described above, except that in the optical device 2110 the doped waveguide core portion 2181 is not limited to being doped with Pr. Instead, the waveguide core portion 2181 may be doped with any rare earth element, such as Er, Yb, or others. The doped waveguide core portion 2181 and cladding 2130 together form a waveguide optical amplifier 2120 similar to any one of the waveguide optical amplifiers described above. The undoped core portion 2145 may form another optical component, such as a WDM coupler, polarization splitter/combiner, or any other optical component which is integrated into the same photonic integrated circuit as the doped waveguide core portion 2181. The optical device 2110 may be configured, in various examples, similarly to any of the optical devices 910, 1010, 1110, 1210, 1310, 1410, and 1510 illustrated in FIGS. 14-21, except that the Pr-doped core portion is replaced with the waveguide core portion 2181 which is doped with another rare earth element.

The particular dimensions of these portions 2181 and 2145 and the distance between the portions 2181 and 2145 can vary from one device to the next depending on materials chosen and design constraints. In some examples, the distance between core portions 2181 and 2145 is about 0.5 μm to 1 μm in regions where coupling between the cores is desired (such as in cases in which a WMD coupler is formed), whereas the distance between core portions 2181 and 2145 may be greater than 1 μm in regions where coupling between the cores is not desired.

Figure 31:
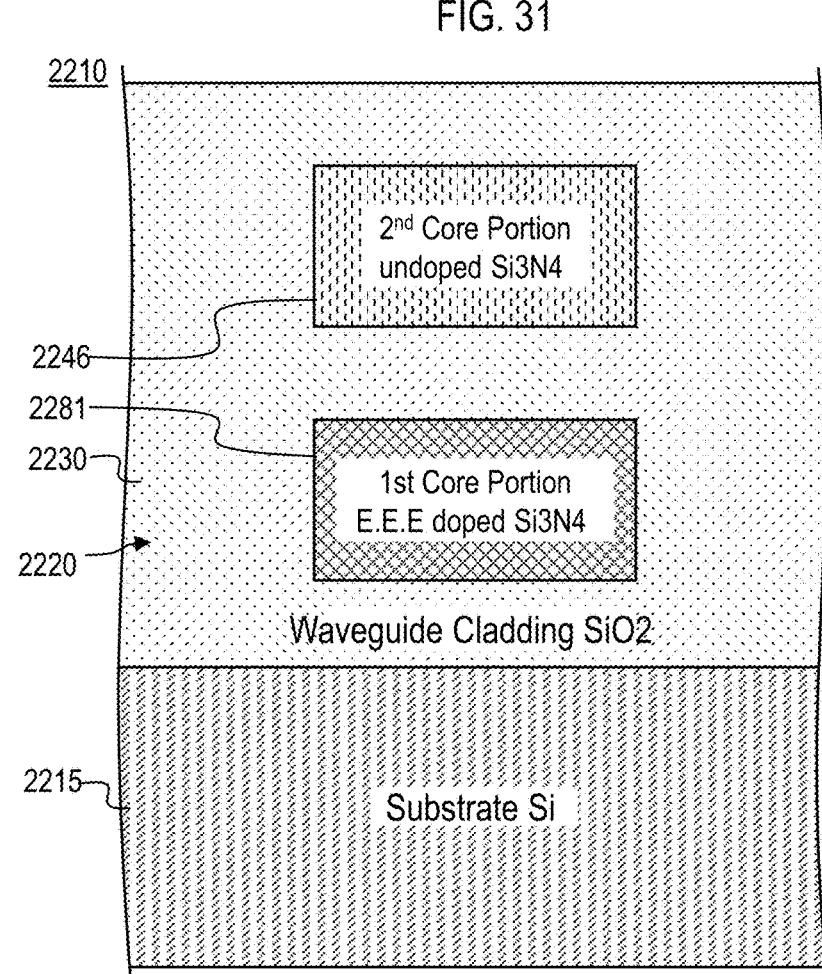
FIG. 31 is a schematic cross-section of another example optical device comprising a waveguide optical amplifier comprising a doped core portion and an undoped core portion in different vertical layers.

Turning now to FIG. 31, an example optical device 2210 will be described. The optical device 2210 comprises a doped waveguide core portion 2281 and an undoped waveguide core portion 2246, which are disposed on the same substrate 2215 in different vertical layers. The optical device 2210 is similar to the optical device 810 described above, except that in the optical device 2210 the doped waveguide core portion 2281 is not limited to being doped with Pr. Instead, the waveguide core portion 2281 may be doped with any rare earth element, such as Er, Yb, or others. The doped waveguide core portion 2281 and cladding 2230 together form a waveguide optical amplifier 2220 similar to any one of the waveguide optical amplifiers described above. The undoped core portion 2246 may form another optical component, such as a WDM coupler, polarization splitter/combiner, or any other optical component which is integrated into the same photonic integrated circuit as the doped waveguide core portion 2281. The optical device 2210 may be configured, in various examples, similarly to any of the optical devices 1610 and 1710 illustrated in FIGS. 21 and 22, except that the Pr-doped core portion is replaced with the waveguide core portion 2181 which is doped with another rare earth element.

The particular dimensions of these portions 2246 and 2281 and the vertical distance between the portions 2246 and 2281 can vary from one device to the next depending on materials chosen and design constraints. In some examples, the distance between core portions 2246 and 2281 is about 0.5 μm to 1 μm in regions where coupling between the cores is desired (such as in cases in which a WMD coupler is formed), whereas the distance between core portions 2246 and 2281 may be greater than 1 μm in regions where coupling between the cores is not desired.

Examples disclosed herein include, but are not limited to, at least the following configurations:

(1) An optical device, comprising: a substrate; and a waveguide optical amplifier formed on the substrate and comprising: a core defining an optical path through the waveguide optical amplifier; and cladding abutting at least one side of the core, wherein the core comprises silicon nitride (Si3N4) doped with Praseodymium (Pr) such that, on condition of pump light and O-band signal light being passed through the waveguide optical amplifier, the waveguide optical amplifier amplifies the O-band signal light.

(2) The optical device of configuration 1, wherein the substrate is silicon and the cladding is silicon oxide.

(3) The optical device of configuration 1, wherein, in a cross-section transverse to the optical path, the cladding surrounds the core.

(4) The optical device of configuration 1, wherein the optical path defined by the core comprises a double spiral.

(5) The optical device of configuration 4, comprising: an input at a first edge of the optical device for optically coupling an input optical fiber to the core; an output at a second edge of the optical device for optically coupling an output optical fiber to the core, the second edge opposite from the first edge.

(6) The optical device of configuration 4, comprising: an input at a first edge of the optical device for optically coupling an input optical fiber to the core; an output at the first edge of the optical device, adjacent to the input, for optically coupling an output optical fiber to the core.

(7) The optical device of any one of configurations 5 or 6, wherein the optical path extends along a first direction at the input and along a second direction at the output, wherein the first and second directions are not perpendicular to either one of the first edge and the second edge.

(8) The optical device of configuration 1, comprising: a second waveguide optical amplifier formed on the substrate and comprising: a second core defining a second optical path through the waveguide, and second cladding abutting at least one side of the second core, wherein the second core comprises silicon nitride (Si3N4) doped with Praseodymium (Pr) such that, on condition of pump light and second O-band signal light being passed through the second waveguide, the second waveguide amplifies the second O-band signal light.

(9) The optical device of configuration 8, wherein the waveguide and the second waveguide are adjacent one another in a same vertical layer on the substrate.

(10) The optical device of configuration 8, wherein the waveguide and the second waveguide are interleaved with one another in a same vertical layer on the substrate.

(11) The optical device of configuration 10, wherein the optical path defined by the core comprises a first double spiral; and wherein the second optical path defined by the second core comprises a second double spiral.

(12) The optical device of configuration 11, wherein the core intersects the second core at an adiabatic crossing at a common center the first and second double spirals.

(13) The optical device of configuration 10, comprising: a first input and a first output coupled to the core; and a second input and a second output coupled to the second core, wherein the first input and the second input are disposed on a first edge of the optical device, and wherein the first output and the second output are disposed on a second edge of the optical device, the second edge opposite from the first edge.

(14) The optical device of configuration 10, a first input and a first output coupled to the core; and a second input and a second output coupled to the second core, wherein the first input, the second input, the first output, and the second output are disposed on a first edge of the optical device.

(15) The optical device of configuration 1, wherein the optical path defined by the core comprises a serpentine.

(16) The optical device of configuration 1, wherein the waveguide optical amplifier comprises a second core defining a second optical path, wherein the optical device comprises a first polarization splitter rotator configured to split first and second polarization modes of the signal light, direct the first mode down the optical path, and direct the second mode down the second optical path; and wherein the optical device comprises a second polarization splitter rotator configured to recombine the first and second modes.

(17) An optical device, comprising: a substrate; and a first waveguide core portion formed on the substrate and comprising silicon nitride (Si3N4) doped with a rare-earth element; a second waveguide core portion formed on the substrate and comprising undoped silicon nitride (Si3N4) and optically coupled to the first core portion;

cladding abutting the first waveguide core portion and the second waveguide core portion, wherein, on condition of pump light and signal light being passed through the first waveguide core portion, the first waveguide core portion amplifies the signal light.

(18) The optical device of configuration 17, wherein the second waveguide core portion forms a wavelength-division-multiplexing (WDM) coupler configured to receive the pump light and the signal light and direct the pump light and signal light into the first waveguide core portion.

(19) The optical device of configuration 18, wherein the second waveguide core portion comprises a first segment configured to receive the signal light and a second segment configured to receive the pump light, wherein the first segment is directly connected to the first core portion and the second segment is arranged to optically couple the pump light from the second segment into the first segment.

(20) The optical device of configuration 19, wherein the first waveguide core portion and the second waveguide core portion are disposed in a same vertical layer.

(21) The optical device of configuration 19, wherein the first waveguide core portion and the second waveguide core portion are disposed in different vertical layers.

(22) The optical device of configuration 18, comprising: a third waveguide core portion comprising undoped silicon nitride (Si3N4) and optically coupled to the first waveguide core portion, wherein in an optical path of the signal light through the optical device, the second waveguide core portion is upstream of the first waveguide core portion, and the first waveguide core portion is upstream of the third waveguide core portion, and wherein the third waveguide core portion forms a second WDM coupler configured to: receive second pump light and direct the second pump light into the first waveguide core portion to travel backward through the first waveguide core portion, and receive the amplified signal light from the first waveguide core portion and direct the amplified signal light to an output of the optical device.

(23) The optical device of configuration 22, wherein the WDM coupler comprises a first input to receive the signal light and a second input to receive the pump light, the first and second inputs disposed adjacent to one another on a first edge of the optical device; wherein the second WDM coupler comprises a first output to output the signal light and a third input to receive the second pump light, the first output and third input disposed adjacent to one another on a second edge of the optical device.

(24) The optical device of configuration 22, wherein the WDM coupler comprises a first input to receive the signal light and a second input to receive the pump light, the first and second inputs disposed adjacent to one another on a first edge of the optical device; wherein the second WDM coupler comprises a first output to output the signal light and a third input to receive the second pump light, the first output and third input disposed adjacent to one another on the first edge of the optical device.

(25) The optical device of configuration 22, wherein the WDM coupler comprises a first input to receive the signal light and a second input to receive the pump light; wherein the second WDM coupler comprises a first output to output the signal light and a third input to receive the second pump light, wherein the first, second, and third inputs are disposed contiguously adjacent to one another on a first edge of the optical device with the first output disposed adjacent the first input.

(26) The optical device of configuration 17, wherein the rare-earth element comprises Praseodymium (Pr) and the signal light is in the O-band.

(27) The optical device of configuration 17, wherein the rare-earth element comprises Erbium (Er) and the signal light is in the C-band.

(28) The optical device of configuration 17, comprising: a fourth waveguide core portion comprising silicon nitride (Si3N4) doped with a second rare-earth element; a fifth waveguide core portion comprising undoped silicon nitride (Si3N4) and optically coupled to the fourth waveguide core portion; wherein, the cladding abuts the fourth waveguide core portion and the fifth waveguide core portion, wherein, on condition of second pump light and second signal light being passed through the fourth waveguide core portion, the fourth waveguide core portion amplifies the second signal light.

(29) The optical device of configuration 28, wherein the first waveguide core portion and the fourth waveguide core portion are adjacent one another in a same vertical layer on the substrate.

(30) The optical device of configuration 28, wherein the first waveguide core portion and the fourth waveguide core portion are interleaved with one another in a same vertical layer on the substrate.

(31) The optical device of configuration 30, wherein the first waveguide core forms a first double spiral; and wherein the fourth waveguide core forms a second double spiral interleaved in parallel with the first double spiral.

(32) The optical device of configuration 28, wherein the first waveguide core portion and the fourth waveguide core portion are vertically stacked in different vertical layers on the substrate.

(33) The optical device of configuration 17, comprising: a third waveguide core portion defining a second optical path, the third waveguide core comprising silicon nitride ($Si_3N_4$) doped with the rare-earth element; wherein the second waveguide core portion forms a polarization splitter rotator configured to split first and second polarization modes of the signal light, direct the first mode down the first waveguide core portion, and direct the second mode down the third waveguide core portion.

(34) An optical device, comprising: a substrate; and a first waveguide core portion formed on the substrate and comprising silicon nitride ($Si_3N_4$) doped with a rare-earth element and disposed in a first vertical layer; a second waveguide core portion formed on the substrate and comprising silicon nitride ($Si_3N_4$), disposed in a second vertical layer, and optically coupled to the first core portion; and cladding abutting the first core portion and the second core portion, wherein, on condition of pump light and signal light being passed through the first waveguide core portion, the first waveguide core portion amplifies the signal light.

(35) The optical device of configuration 34, wherein the second waveguide core portion comprises undoped silicon nitride ($Si_3N_4$).

(36) The optical device of configuration 35, wherein the second waveguide core portion comprises a wavelength-division-multiplexing (WDM) coupler configured to receive the pump light and the signal light and direct the pump light and signal light into the first waveguide core portion, and wherein at least part of the WDM coupler is vertically stacked on at least part of the first waveguide core portion.

(37) The optical device of configuration 34, wherein the second waveguide core portion comprises silicon nitride ($Si_3N_4$) doped with the rare-earth element and, on condition of pump light and the signal light being passed through the second waveguide core portion, the second waveguide core portion amplifies the signal light.

(38) The optical device of configuration 34, wherein the first waveguide core portion forms a first double spiral and the second waveguide core portion forms a second double spiral stacked vertically on the first double spiral.

(39) An optical device, comprising: a substrate; and a first waveguide formed on the substrate, the first waveguide comprising: a first core portion comprising silicon nitride ($Si_3N_4$) doped with a first rare-earth element and disposed in a first vertical layer; first cladding abutting the first core portion, wherein, on condition of pump light and signal light being passed through the first core portion, the first core portion amplifies the signal light; and a second waveguide formed on the substrate, the second waveguide comprising: a second core portion comprising silicon nitride ($Si_3N_4$) doped with a second rare-earth element and disposed in a second vertical layer; second cladding abutting the second core portion, wherein, on condition of second pump light and second signal light being passed through the second core portion, the second core portion amplifies the second signal light, wherein at least part of the first waveguide is vertically stacked on at least part of the second waveguide.

(40) The optical device of configuration 39, wherein the first rare earth element is the same as the second rare earth element.

(41) The optical device of configuration 39, wherein the first rare earth element is different than the second rare earth element.

(42) The optical device of configuration 41, wherein the first signal light is in one of the O-band and the C-band and the second signal light is in the other of the O-band and the C-band.

It is to be understood that both the general description and the detailed description provide examples that are explanatory in nature and are intended to provide an understanding of the present disclosure without limiting the scope of the present disclosure. Various mechanical, compositional, structural, electronic, and operational changes may be made without departing from the scope of this description and the claims. In some instances, well-known circuits, structures, and techniques have not been shown or described in detail in order not to obscure the examples. Like numbers in two or more figures represent the same or similar elements.

In addition, the singular forms "a", "an", and "the" are intended to include the plural forms as well, unless the context indicates otherwise. Moreover, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electronically or mechanically directly coupled, or they may be indirectly coupled via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

And/or: Occasionally the phrase "and/or" is used herein in conjunction with a list of items. This phrase means that any combination of items in the list—from a single item to all of the items and any permutation in between—may be included. Thus, for example, "A, B, and/or C" means "one of {A}, {B}, {C}, {A, B}, {A, C}, {C, B}, and {A, C, B}".

Elements and their associated aspects that are described in detail with reference to one example may, whenever practical, be included in other examples in which they are not specifically shown or described. For example, if an element is described in detail with reference to one example and is not described with reference to a second example, the element may nevertheless be claimed as included in the second example.

Unless otherwise noted herein or implied by the context, when terms of approximation such as "substantially," "approximately," "about," "around," "roughly," and the like, are used, this should be understood as meaning that mathematical exactitude is not required and that instead a range of variation is being referred to that includes but is not strictly limited to the stated value, property, or relationship. In particular, in addition to any ranges explicitly stated herein (if any), the range of variation implied by the usage of such a term of approximation includes at least any inconsequential variations and also those variations that are typical in the relevant art for the type of item in question due to manufacturing or other tolerances. In any case, the range of variation may include at least values that are within ±1% of the stated value, property, or relationship unless indicated otherwise.

Further modifications and alternative examples will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various examples shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present teachings and following claims.

It is to be understood that the particular examples set forth herein are non-limiting, and modifications to structure, dimensions, materials, and methodologies may be made without departing from the scope of the present teachings.

Other examples in accordance with the present disclosure will be apparent to those skilled in the art from consideration of the specification and practice of the invention disclosed herein. It is intended that the specification and examples be considered as exemplary only, with the following claims being entitled to their fullest breadth, including equivalents, under the applicable law.

What is claimed is:

1. An optical device, comprising:
a substrate; and
a waveguide optical amplifier formed on the substrate and comprising:
  a core defining an optical path through the waveguide optical amplifier; and
  cladding abutting at least one side of the core, wherein the core comprises a silicon-based material doped with Praseodymium (Pr) such that, on condition of pump light and O-band signal light being passed through the waveguide optical amplifier, the waveguide optical amplifier amplifies the O-band signal light.

2. The optical device of claim 1,
wherein core comprises silicon nitride ($Si_3N_4$), silicon rich nitride, silicon oxide ($SiO_2$), or silicon oxyntride ($Si(x)O(y)N(z)$); and
wherein the cladding comprises nitride ($Si_3N_4$), silicon oxide ($SiO_2$), or silicon oxyntride ($Si(x)O(y)N(z)$).

3. The optical device of claim 1,
wherein the substrate is silicon or glass.

4. The optical device of claim 1,
wherein the optical path defined by the core comprises a double spiral.

5. The optical device of claim 1, comprising:
an input at a first edge of the optical device for optically coupling an input optical fiber to the core; and
an output at a second edge of the optical device for optically coupling an output optical fiber to the core, the second edge different from the first edge.

6. The optical device of claim 1, comprising:
an input at a first edge of the optical device for optically coupling an input optical fiber to the core; and
an output at the first edge of the optical device, adjacent to the input, for optically coupling an output optical fiber to the core.

7. The optical device of claim 5,
wherein the optical path extends along a first direction at the input and along a second direction at the output, wherein the first direction is at an acute angle relative to the first edge and the second direction is at an acute angle relative to the second edge.

8. The optical device of claim 1, comprising:
a second waveguide optical amplifier formed on the substrate and comprising:
  a second core defining a second optical path through the second waveguide optical amplifier, and
  second cladding abutting at least one side of the second core, wherein the second core comprises a silicon-based material doped with Praseodymium (Pr) such that, on condition of pump light and second O-band signal light being passed through the second waveguide optical amplifier, the second waveguide optical amplifier amplifies the second O-band signal light.

9. The optical device of claim 8,
wherein the waveguide optical amplifier and the second waveguide optical amplifier are adjacent to one another in a same vertical layer on the substrate or are interleaved with one another in a same vertical layer on the substrate.

10. The optical device of claim 1, wherein the waveguide optical amplifier comprises a second core defining a second optical path, wherein the optical device comprises a polarization splitter rotator configured to split first and second polarization modes of the signal light, rotate the first mode and direct the rotated first mode down the optical path, and direct the second mode down the second optical path; and wherein the optical device comprises a polarization rotator combiner configured to rotate the second mode and combine the rotated first mode and the rotated second mode.

11. The optical device of claim 1, wherein the cladding comprises a silicon-based material and the cladding comprises a first region that is doped with a rare-earth element and a second region that is not doped.

12. An optical device, comprising:

a substrate; and a first waveguide core portion formed on the substrate and comprising silicon-based material doped with a rare-earth element;

a second waveguide core portion formed on the substrate and comprising an undoped silicon-based material and optically coupled to the first core portion;

cladding abutting the first waveguide core portion and the second waveguide core portion, wherein, on condition of pump light and signal light being passed through the first waveguide core portion, the first waveguide core portion amplifies the signal light.

13. The optical device of claim 12, wherein the second waveguide core portion forms a wavelength-division-multiplexing (WDM) coupler configured to receive the pump light and the signal light and direct the pump light and signal light into the first waveguide core portion.

14. The optical device of claim 13, wherein the second waveguide core portion comprises a first segment configured to receive the signal light and a second segment configured to receive the pump light, wherein the first segment is directly connected to the first core portion and the second segment is arranged to optically couple the pump light from the second segment into the first segment.

15. The optical device of claim 12, wherein the first waveguide core portion and the second waveguide core portion are disposed in a same vertical layer.

16. The optical device of claim 12, wherein the first waveguide core portion and the second waveguide core portion are disposed in different vertical layers.

17. The optical device of claim 12, comprising:

a third waveguide core portion comprising an undoped silicon-based material and optically coupled to the first waveguide core portion, wherein in an optical path of the signal light through the optical device, the second waveguide core portion is upstream of the first waveguide core portion, and the first waveguide core portion is upstream of the third waveguide core portion.

18. The optical device of claim 17, comprising:

a fourth waveguide core portion comprising a silicon-based material doped with a second rare-earth element;

a fifth waveguide core portion comprising an undoped silicon-based material and optically coupled to the fourth waveguide core portion;

wherein, the cladding abuts the fourth waveguide core portion and the fifth waveguide core portion, wherein, on condition of second pump light and second signal light being passed through the fourth waveguide core portion, the fourth waveguide core portion amplifies the second signal light.

19. The optical device of claim 18, wherein the first waveguide core portion and the fourth waveguide core portion are adjacent to one another in a same vertical layer on the substrate or are interleaved with one another in a same vertical layer on the substrate.

20. The optical device of claim 18, wherein the first waveguide core portion and the fourth waveguide core portion are vertically stacked in different vertical layers on the substrate.

* * * * *